US012646234B1

(12) United States Patent
　　Darkazanli

(10) Patent No.: US 12,646,234 B1
(45) Date of Patent: Jun. 2, 2026

(54) SYSTEM AND METHOD FOR CONTEXT-AWARE ADAPTIVE GENERATION OF USER INTERFACE SCENES

(71) Applicant: Plerion AI, Inc., San Diego, CA (US)

(72) Inventor: Ammar Darkazanli, Rockwall, TX (US)

(73) Assignee: Plerion AI, Inc., San Diego, CA (US)

( * ) Notice: Subject to any disclaimer, the term of this patent is extended or adjusted under 35 U.S.C. 154(b) by 0 days.

(21) Appl. No.: 19/357,821

(22) Filed: Oct. 14, 2025

Related U.S. Application Data

(60) Provisional application No. 63/858,772, filed on Aug. 6, 2025.

(51) Int. Cl.
　　*G06T 11/60*　　(2006.01)
　　*G06F 3/14*　　(2006.01)
　　*G06F 9/451*　　(2018.01)
　　*G06F 3/01*　　(2006.01)

(52) U.S. Cl.
　　CPC ............ *G06T 11/60* (2013.01); *G06F 3/1454* (2013.01); *G06F 9/451* (2018.02); *G06F 3/013* (2013.01); *G06T 2200/24* (2013.01)

(58) Field of Classification Search
　　None
　　See application file for complete search history.

(56) References Cited

U.S. PATENT DOCUMENTS

| | | | |
|---|---|---|---|
| 4,845,653 A | 7/1989 | Conrad et al. | |
| 7,752,044 B2 * | 7/2010 | Lam ........................ | G10L 15/08 |
| | | | 704/254 |
| 8,937,620 B1 * | 1/2015 | Teller ................... | G11B 27/031 |
| | | | 345/473 |

(Continued)

OTHER PUBLICATIONS

Andrew Martin, What Is Context-Aware Personalization in Interfaces. Wikipedia, Published on Apr. 28, 2025, Retrieved on Jan. 21, 2026, 11 Pages. URL[https://www.uxpin.com/studio/blog/what-is-context-aware-personalization-in-interfaces/].

(Continued)

*Primary Examiner* — Toan H Vu
(74) *Attorney, Agent, or Firm* — FP; Sikander M. Khan

(57) ABSTRACT

A computer-implemented system and method for predictive scene-based user interface orchestration are disclosed. A plurality of context parameters, including behavioral, environmental, temporal, task-related, social, emotional, and device-ecosystem data, are acquired from sensors and applications. A context vector is generated comprising parameter values with confidence scores and temporal-decay values, and a context score is computed by applying a weighted aggregation. One or more context states are predicted using a machine learning model, and candidate interface scenes comprising layout structures, interaction flows, and component hierarchies are pre-generated. A transition policy is applied to select a candidate scene, which is rendered with continuity preservation and cinematic transitions that maintain user mental models and application state. Upon detection of unsatisfactory performance, rollback to a prior scene (Continued)

800

Acquiring a plurality of context parameters generating, from the plurality of context parameters, a context vector comprising values of the parameters together with corresponding confidence scores and temporal-decay values computing a context score by applying a weighted aggregation of the values, confidence scores, and temporal-decay values predicting, using a machine learning model, one or more future context states based on the context vector pre-generating, for the one or more future context states, a plurality of candidate interface scenes comprising layout structures, interaction flows, and component hierarchies selecting a candidate interface scene by applying a transition policy that enforces continuity preservation across interface states rendering the selected candidate interface scene on a display device, the rendering comprising a cinematic transition that maintains user mental models and application state upon detection that the selected candidate interface scene does not satisfy a performance criterion, reverting to a previously active interface scene using a rollback procedure synchronizing the selected candidate interface scene with a companion device to maintain cross-device continuity of user interaction is executed. The selected scene is synchronized with a companion device, enabling seamless cross-device continuity of user interaction.

20 Claims, 23 Drawing Sheets

(56) References Cited

U.S. PATENT DOCUMENTS

| | | |
|---|---|---|
| 2009/0055739 A1 | 2/2009 | Murillo et al. |
| 2013/0166303 A1* | 6/2013 | Chang ................. G06F 16/7834 |
| | | 707/723 |
| 2017/0019530 A1* | 1/2017 | Wu ................... H04M 1/72454 |
| 2017/0163958 A1* | 6/2017 | Hu ....................... H04N 13/344 |
| 2020/0180647 A1* | 6/2020 | Anthony ............ B60W 60/0011 |
| 2020/0233916 A1* | 7/2020 | Hoots ................. G06F 16/9538 |
| 2021/0064704 A1* | 3/2021 | Yang ........................ G06F 40/58 |
| 2021/0366183 A1* | 11/2021 | Gisslén ................... G06N 3/045 |
| 2023/0025371 A1 | 1/2023 | Syed et al. |
| 2023/0334153 A1* | 10/2023 | Shachar .................. H04L 63/10 |
| 2024/0289863 A1 | 8/2024 | Smith Lewis et al. |
| 2025/0095393 A1* | 3/2025 | Yang ..................... G06F 40/205 |
| 2025/0226057 A1* | 7/2025 | Xavier .................... G06F 30/27 |

OTHER PUBLICATIONS

Anonymous, patent-for-ai-powered-interactive-dashboard, Wikipedia, Published on Dec. 24, 2024, Retrieved on Jan. 21, 2026, 6 pages. Retrieved from [URL: https://prophetstor.com/2024/12/23/patent-for-ai-powered-interactive-dashboard/].

Anonymous, UI Design Trends to Consider in 2025, Wikipedia, Published on Mar. 19, 2025, Retrieved on Jan. 21, 2026, 10 Pages. URL[https://pedalsup.com/ui-design-trends-to-consider-in-2025/].

Anonymous, Animate layout changes using a transition, Wikipedia, Retrieved on Jan. 21, 2026, 16 Pages. URL [https://developer.android.com/develop/ui/views/animations/transitions].

Aparna KS The Predictive Revolution: How Machine Learning(ML) is Shaping User Behavior in 2025, Wikipedia, Published on Oct. 14, 2025, Retrieved on Jan. 21, 2026, 15 Pages. URL[https://www.aufaitux.com/blog/user-behavior-predictive-ml-ui-ux-design/].

Bao Tran, Adaptive UI Patent: Microsoft's Legal Precedent, Wikipedia, Published on Dec. 26, 2025, Retrieved on Jan. 21,2026, 17 pages. Retrieved from [URL: https://patentpc.com/blog/adaptive-ui-patent-microsofts-legal-precedent].

Bao Tran, Navigating Patent Eligibility For AI—Driven Software Innovations, Wikipidea, Retrieved on Jan. 19, 2026, 19 pages. URL[https://patentpc.com/blog/navigating-patent-eligibility-for-ai-driven-software-innovations].

Bao Tran, The Rise Of Generative AI Patents: Stats On LLM& AI Model Innovations, Wikipedia, Retrieved on Jan. 21, 2026, 23 Pages. URL[https://patentpc.com/blog/the-rise-of-generative-ai-patents-stats-on-llm-ai-model-innovations].

Bardehle Pagenberg, Artificial Intelligence, Wikipedia, Retrieved on Jan. 21, 2026, 2 Pages. URL[https://www.bardehle.com/europeansoftwarepatents/knowledge-base-category/artificial-intelligence/].

Innervate, Data-Driven Dynamic Content Orchestration, Wikipedia, Retrieved on Jan. 21, 2026, 13 Pages. URL [https://www.innervate.com/].

Iveta Petrova, Patent Strategies in the AI Era, Wikipedia, Retrieved on Jan. 21, 2026, 4 Pages. URL[https://www.evalueserve.com/blog/patent-strategies-in-the-ai-era/].

Jim Kutz, 12 Best Open-Source Data Orchestration Tools in 2025, Wikipedia, Published on Dec. 16, 2025, Retrieved on Jan. 21, 2026, 14 Pages. URL[https://airbyte.com/top-etl-tools-for-sources/data-orchestration-tools].

Maryam Miradi, EvoPat's Multi-LLM Architecture, Linkedin, Retrieved on Janury 21, 2026, 3 Pages. URL[https://www.linkedin.com/posts/maryammiradi_ai-agents-for-patent-analysis-evopats-activity-7278798539722293248-ImoY].

Patrik, Top 10 UX/UI Design Trends of 2025, Wikipedia, Published on Dec. 10, 2024, Retrieved on Jan. 21, 2026, 9 Pages, URL[https://www.aufaitux.com/blog/user-behavior-predictive-ml-ui-ux-design/].

Tingxin Yan etal, Fast App Launching for Mobile Devices Using Predictive User Context, Retrieved on Jan. 21, 2026, 14 pages.

Yunpeng Song etal, Navigating Interfaces with AI for Enhanced User Interaction, Wikipedia, Published on Dec. 18, 2023, Retreived on Jan. 21, 2026, 35 Pages. URL[https://arxiv.org/html/2312.11190v1].

Yunpeng Song, Navigating Interfaces with AI for Enhanced User Interaction, Published on Dec. 18, 2023, Retreived on Jan. 21, 2026, 11 pages.

* cited by examiner

220

231

300

Figure 5:
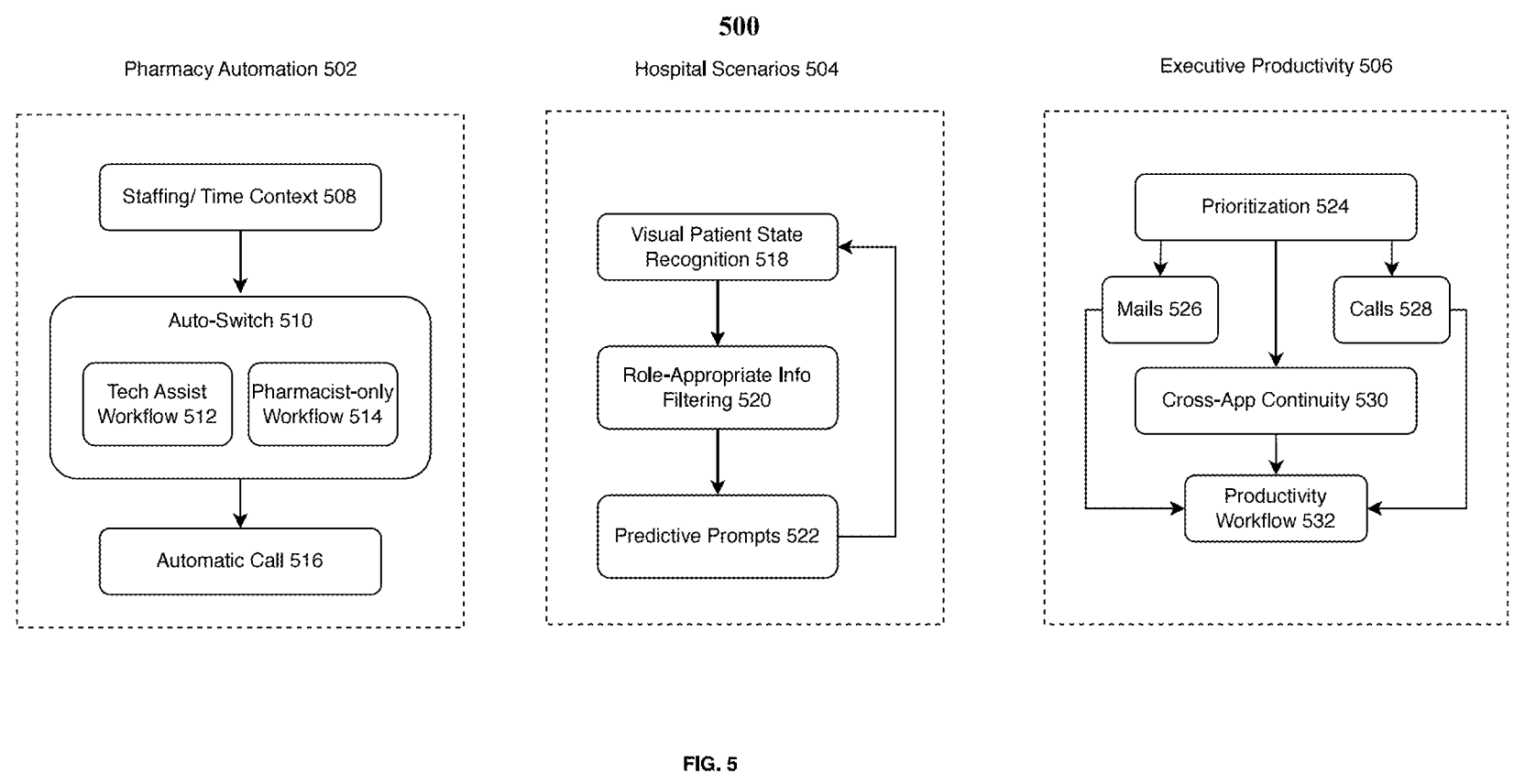

500

Executive Productivity 506

Prioritization 524

Calls 528

Mails 526

Cross-App Continuity 530

Productivity Workflow 532

Hospital Scenarios 504

Visual Patient State Recognition 518

Role-Appropriate Info Filtering 520

Predictive Prompts 522

Pharmacy Automation 502

Staffing/Time Context 508

Auto-Switch 510

Pharmacist-only Workflow 514

Tech Assist Workflow 512

Automatic Call 516

Acquiring a plurality of context parameters associated with a user, 702

Predicting a future context state based on the plurality of context parameters, 704

Generating one or more interface scenes corresponding to the predicted future context state, 706

Activating a selected interface scene while preserving continuity of user interaction, 708

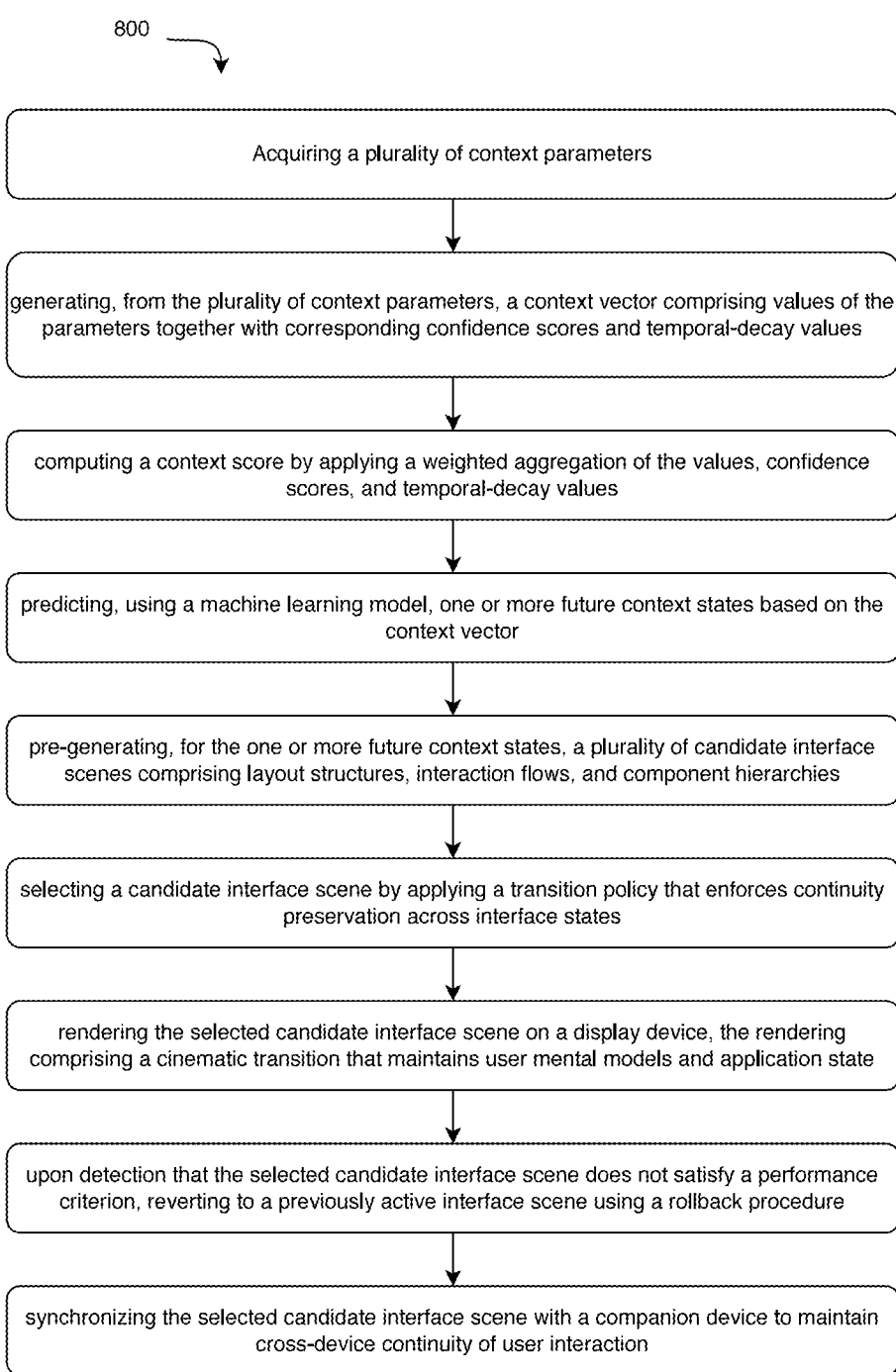

800

Acquiring a plurality of context parameters generating, from the plurality of context parameters, a context vector comprising values of the parameters together with corresponding confidence scores and temporal-decay values computing a context score by applying a weighted aggregation of the values, confidence scores, and temporal-decay values predicting, using a machine learning model, one or more future context states based on the context vector pre-generating, for the one or more future context states, a plurality of candidate interface scenes comprising layout structures, interaction flows, and component hierarchies selecting a candidate interface scene by applying a transition policy that enforces continuity preservation across interface states rendering the selected candidate interface scene on a display device, the rendering comprising a cinematic transition that maintains user mental models and application state upon detection that the selected candidate interface scene does not satisfy a performance criterion, reverting to a previously active interface scene using a rollback procedure synchronizing the selected candidate interface scene with a companion device to maintain cross-device continuity of user interaction

FIG. 8

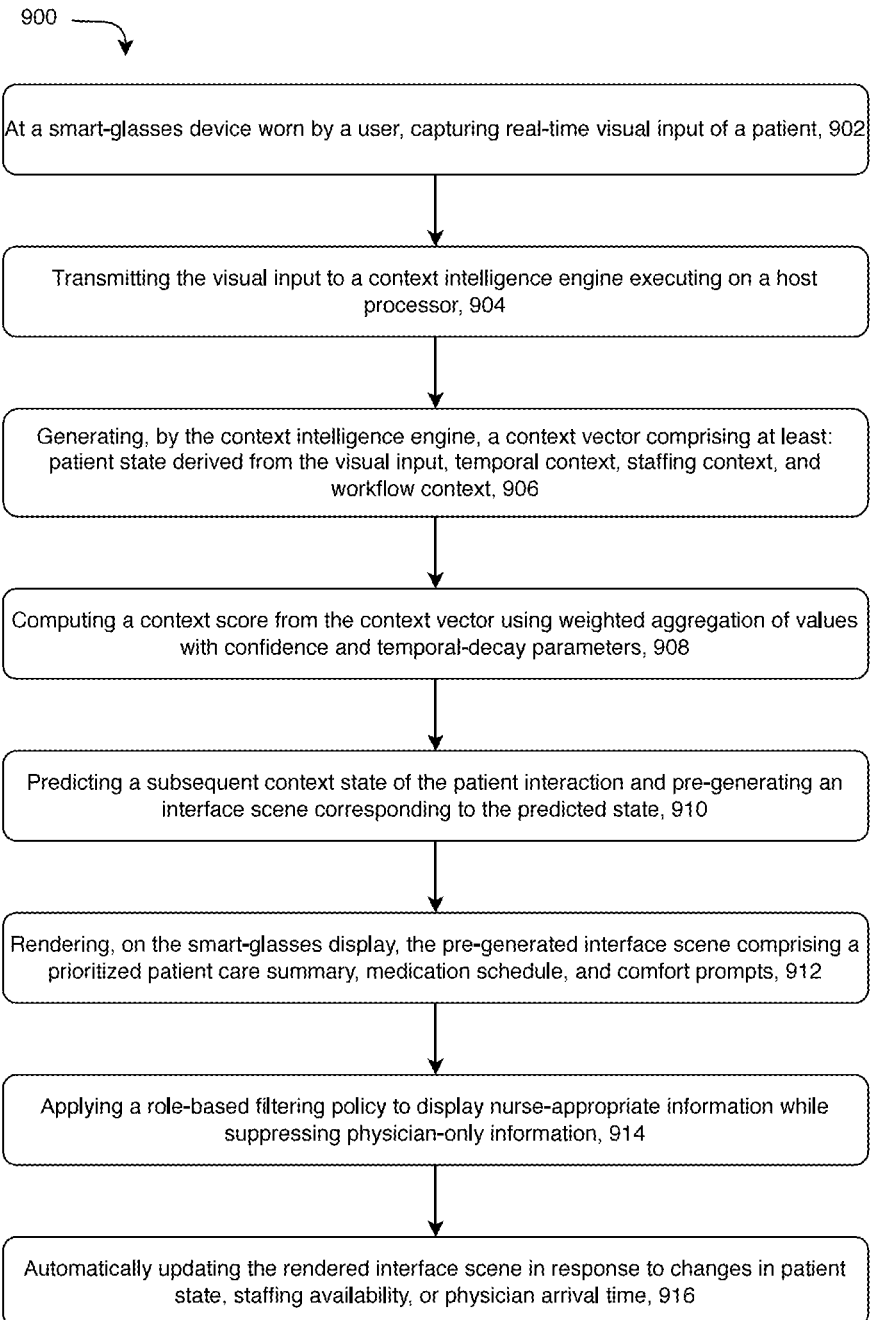

900

At a smart-glasses device worn by a user, capturing real-time visual input of a patient, 902

Transmitting the visual input to a context intelligence engine executing on a host processor, 904

Generating, by the context intelligence engine, a context vector comprising at least: patient state derived from the visual input, temporal context, staffing context, and workflow context, 906

Computing a context score from the context vector using weighted aggregation of values with confidence and temporal-decay parameters, 908

Predicting a subsequent context state of the patient interaction and pre-generating an interface scene corresponding to the predicted state, 910

Rendering, on the smart-glasses display, the pre-generated interface scene comprising a prioritized patient care summary, medication schedule, and comfort prompts, 912

Applying a role-based filtering policy to display nurse-appropriate information while suppressing physician-only information, 914

Automatically updating the rendered interface scene in response to changes in patient state, staffing availability, or physician arrival time, 916

FIG. 9

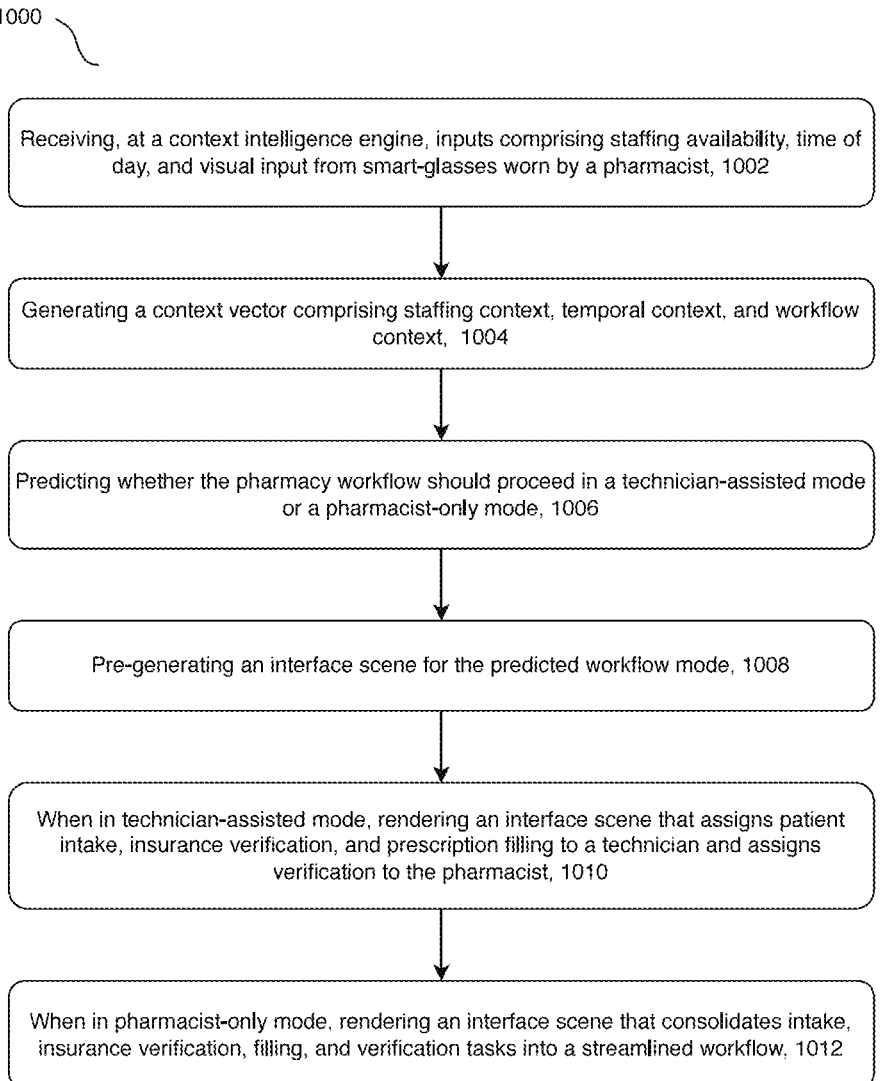

1000

Receiving, at a context intelligence engine, inputs comprising staffing availability, time of day, and visual input from smart-glasses worn by a pharmacist, 1002

Generating a context vector comprising staffing context, temporal context, and workflow context, 1004

Predicting whether the pharmacy workflow should proceed in a technician-assisted mode or a pharmacist-only mode, 1006

Pre-generating an interface scene for the predicted workflow mode, 1008

When in technician-assisted mode, rendering an interface scene that assigns patient intake, insurance verification, and prescription filling to a technician and assigns verification to the pharmacist, 1010

When in pharmacist-only mode, rendering an interface scene that consolidates intake, insurance verification, filling, and verification tasks into a streamlined workflow, 1012

FIG. 10

Inference Logic 1100

Inference Logic 1100

```
batch_size = tf.shape (x) [0]
x = self.rescale(x)
patches = self.extract_patches (x)
x = self.patch_proj (patches)

class_emb = tf.broadcast_to(
    self.class_emb, [batch_size, 1, self.d_model]
)
x = tf.concat([class_emb, x], axis=1)
x = x + self.pos_emb for layer in self.enc_layers:
    x = layer (x, training)

return  self.mlp_head(x[:, 0])
```

FIG. 20

SYSTEM AND METHOD FOR CONTEXT-AWARE ADAPTIVE GENERATION OF USER INTERFACE SCENES

This document is a United States Non-provisional utility patent application under statute 35 U.S.C. 111(A). This document claims priority and benefit to a U.S. Provisional utility patent application that is identified by a Serial No: 63/858,772 and that is titled "AI-Driven Contextual Scene-Based User Interface System", and that was filed with the U.S. Patent and Trademark Office (USPTO) on Aug. 6, 2025. The above-referenced document is herein incorporated by reference in its entirety.

TECHNICAL FIELD

The present disclosure relates generally to adaptive user interface systems, and more particularly, to computing systems that generate and manage user interface scenes based on multi-parameter analysis of user and environmental context.

BACKGROUND OF THE INVENTION

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

Modern computing systems are expected to function across diverse environments, devices, and operational conditions. Users often transition between wearables, mobile devices, desktops, and cloud-connected services. For instance, a nurse may access patient data during morning rounds in a hospital, a pharmacist may process prescriptions with reduced staffing near closing hours, an individual may interact with mobile applications while walking, and an executive may work across devices when preparing for a compliance deadline. In such situations, computing systems are required to acquire and interpret large volumes of heterogeneous signals. Existing solutions generally provide partial or fragmented support, relying on manual configuration, device-level adaptation, or limited contextual triggers, which result in inefficiency, discontinuity, and increased error rates.

Several categories of adaptive technologies exist. Responsive design frameworks primarily scale or reformat content for different screen sizes or device orientations. These approaches are limited to display adaptation and do not extend to predictive processing of contextual information. Rule-based systems employ predefined triggers such as location or time but are constrained to narrow conditions and fail to handle complex multi-parameter combinations. Personalization engines focus on filtering or ranking data, often using behavioral or preference information, but they do not restructure system behavior or workflows. More advanced generative systems are capable of composing content or interface elements dynamically but typically do not integrate predictive forecasting, continuity management, or multi-device synchronization.

Related work also shows limitations in broader computing applications. Context-aware computing methods have been proposed that adapt system behavior to sensor inputs such as ambient lighting, location, or sound. These methods react to isolated signals but do not integrate a complete set of parameters that include behavioral, environmental, temporal, task, social, emotional, and device-ecosystem information. Conversational or agent-based systems can adjust outputs based on dialogue context, yet they focus narrowly on linguistic interaction rather than holistic situational modeling. Workflow engines and design frameworks can animate transitions between predefined states, but they assume that target states are already designed and available. Commercial personalization and data-distribution systems emphasize delivering content across channels but do not unify sensing, prediction, filtering, and continuity preservation in a single system.

Persistent shortcomings can be identified across these approaches. Most systems process contextual parameters in isolation rather than in a unified representation. Architectures are often static, requiring users or developers to manually configure or select modes. Current systems are predominantly reactive, responding to events after they occur, rather than predictive, where future states are anticipated and system resources are prepared in advance. As the number of contextual parameters increases, developer effort grows significantly, since each variation must be designed, tested, and maintained separately. In mission-critical domains such as healthcare and pharmacy, existing approaches also lack robust mechanisms for role-based filtering, creating risk when sensitive data is improperly presented. Moreover, as users increasingly depend on multiple devices in parallel, existing systems fail to provide reliable continuity of context and state across smart glasses, mobile phones, workstations, and cloud platforms.

Accordingly, there exists a need for a multi-parameter context analysis system that integrates heterogeneous contextual signals into a unified framework, computes context vectors and scores in real time, and predicts context states that may occur in future. Such a system should pre-generate candidate scenes or operational states aligned with the predicted requirements, enforce continuity-preserving transitions, provide rollback capabilities when performance criteria are not met, and apply role-aware filtering to regulate access to sensitive information. Furthermore, the system should synchronize context and state across companion devices to maintain continuity of operation. These capabilities are necessary to reduce user and system inefficiencies, enhance accuracy in critical workflows, improve accessibility across environments, and mitigate the complexity of supporting varied situational contexts in computing systems.

SUMMARY

A computer-implemented method for adaptive user interface scene orchestration is disclosed. At one or more processors coupled to a memory and a plurality of sensors, the method includes acquiring a plurality of context parameters including behavioral data, environmental factors, temporal parameters, task-related indicators, social signals, emotional indicators, and device-ecosystem availability. The method further includes generating, from the plurality of context parameters, a context vector comprising values of the parameters together with corresponding confidence scores and temporal-decay values. The method further includes computing a context score by applying a weighted aggregation of the values, confidence scores, and temporal-decay values. The method further includes predicting, using a machine learning model, one or more context states based on the context vector. The method further includes pre-generating, for the one or more predicted context states, a plurality of candidate interface scenes comprising layout structures, interaction flows, and component hierarchies. The method further includes selecting a candidate interface scene by applying a transition policy that enforces continuity preservation across interface states. The method further includes rendering the selected candidate interface scene on a display device, the rendering comprising a cinematic transition that maintains user mental models and application state. The method further includes, upon detection that the selected candidate interface scene does not fulfil a performance criterion, reverting to a previously active interface scene using a rollback procedure. The method further includes synchronizing the selected candidate interface scene with a companion device to maintain cross-device continuity of user interaction.

A system for predictive scene-based user interface orchestration is also disclosed. The system comprises a memory storing instructions and one or more processors configured to execute the instructions to receive a plurality of context parameters comprising behavioral, environmental, temporal, task, social, emotional, and device-ecosystem data. The system further generates a context vector comprising the context parameters, confidence scores, and temporal-decay values, computes a context score based on weighted aggregation of the context vector, and predicts one or more context states. The system pre-generates candidate interface scenes corresponding to the predicted context states, applies a transition policy to select one of the candidate interface scenes for rendering, and renders the selected interface scene with continuity preservation and cinematic transition. The system reverts to a prior interface scene when the selected interface scene fails a performance criterion and synchronizes the selected interface scene with a companion device for cross-device continuity.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 illustrates exemplary use case workflows in pharmacy automation, hospital care, and executive productivity, according to certain embodiments.

FIG. 8 illustrates a method for acquiring context parameters, generating context vectors, predicting context states, and synchronizing scenes across devices, according to certain embodiments.

FIG. 9 illustrates a method for predictive scene orchestration in a hospital scenario using smart glasses, according to certain embodiments.

FIG. 10 illustrates a method for predictive scene orchestration in a pharmacy workflow scenario, according to certain embodiments.

FIG. 20 shows example software code that implements a Transformer block.

DETAILED DESCRIPTION

Figure 1A:
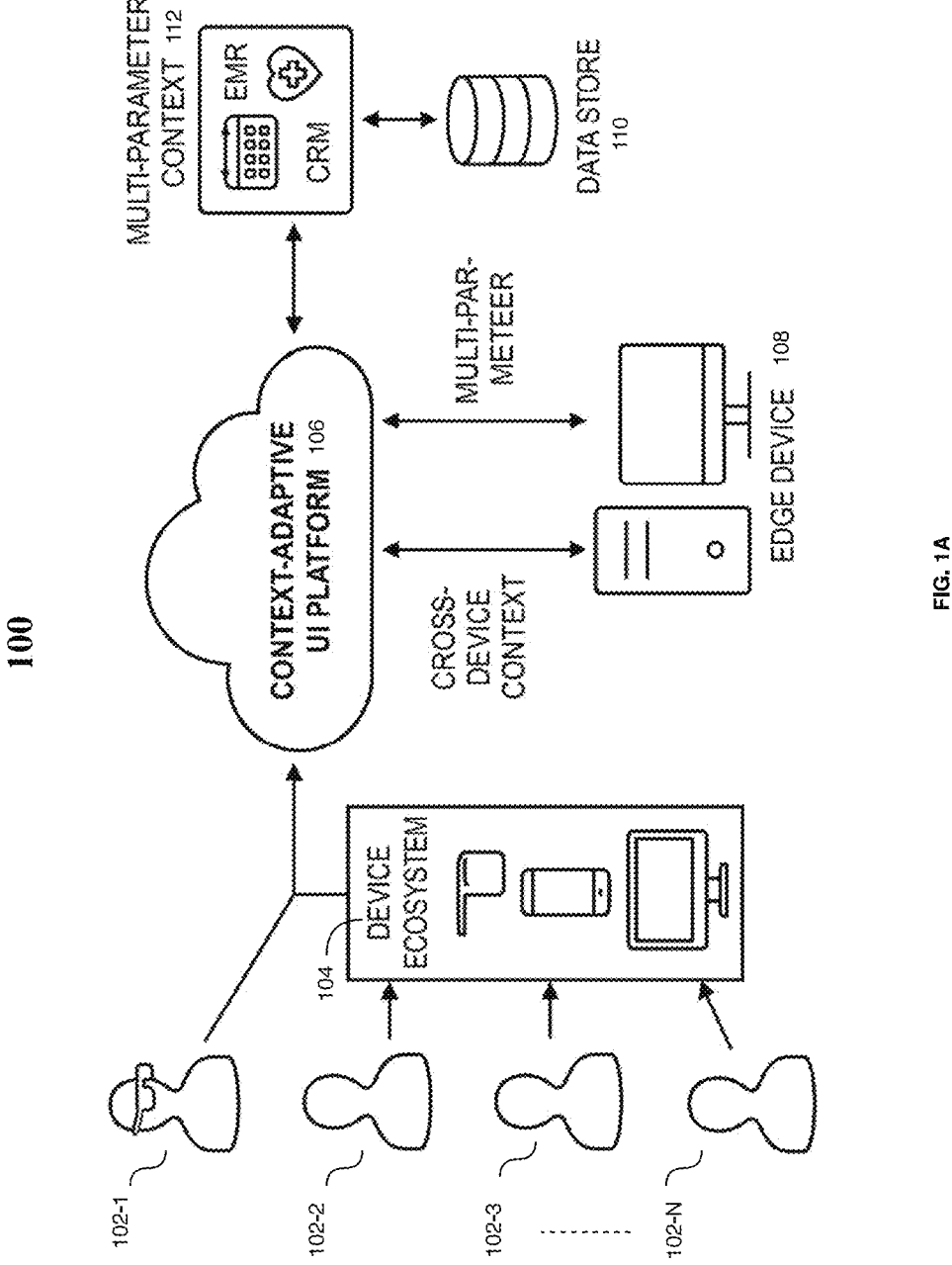
FIG. 1A illustrates a computing and network environment including users, devices, edge resources, and a multi-parameter context analysis system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Conventional computing systems process contextual information in a fragmented and reactive manner. Existing approaches such as responsive design, rule-based triggers, or personalization engines are limited to isolated parameters, static workflows, or content filtering, and therefore fail to anticipate context states that may occur in future, preserve continuity across transitions, or synchronize tasks across multiple devices. These limitations increase user cognitive load, reduce task efficiency, and create risks in domains such as healthcare and pharmacy where role-appropriate filtering and continuity are critical.

The present disclosure provides a multi-parameter context analysis system that acquires heterogeneous contextual data including behavioral, environmental, temporal, task, social, emotional, and device-ecosystem parameters, generates a unified context vector with confidence and temporal-decay values, and computes a context score. Using predictive modeling, the system forecasts predicted context states, pre-generates candidate scenes, and applies a transition policy to activate scenes with continuity preservation, roll-back capability, role-aware filtering, and cross-device synchronization, thereby enabling efficient, predictive, and adaptive orchestration of computing environments.

DESCRIPTION OF THE INVENTION

Computing and Network Environment

FIG. 1A illustrates a context-adaptive user interface computing and network environment 100. The context-adaptive user interface computing and network environment, also referred to as the environment 100, is configured to generate, select, and activate interface scenes optimized for a user's current and predicted context across heterogeneous devices. The environment 100 implements a scene-orchestration architecture for adaptive human-computer interaction in which multi-parameter context is acquired from devices and enterprise systems, transformed into a weighted representation, and used to anticipate user needs, pre-compose candidate interface scenes, and activate a selected interface scene with continuity preservation across devices.

The environment 100 comprises a plurality of users 102-1, 102-2, 102-3, . . . 102-N communicatively coupled to a device ecosystem 104. Each of the users 102-1 . . . 102-N represents a human operator (for example, a clinician wearing smart glasses, a pharmacist at a point-of-sale terminal, an executive using a smartphone and a laptop, or a customer browsing on a desktop computer). A given user may employ one or more devices concurrently or sequentially, such as smart glasses, smartphones, tablets, workstations, or peripherals (e.g., external keyboards, pointing devices, heart-rate straps, and environmental sensors). In operation, behavioral, environmental, temporal, task, social, emotional, and device-availability signals associated with each of the users 102-1 . . . 102-N are acquired and normalized for downstream processing, as described below.

The device ecosystem 104 denotes a local collection of user equipment and peripherals configured to provide context signals and receive activated interface scenes. In various embodiments, the device ecosystem 104 includes: (i) wearable smart glasses having an inertial measurement unit (IMU), a camera, an eye-tracking sensor, a microphone, and a near-eye display; (ii) a mobile device having a touch-screen, GPS, motion sensors, and a wireless transceiver; and (iii) a desktop or laptop host having a display, keyboard, mouse, and network interface. The device ecosystem 104 is further configured to expose device-capability descriptors (for example, screen size, input modality, compute budget, battery state) and device-availability descriptors (for example, which devices are active, in-range, or paired), to permit cross-device continuity of interaction. In one configuration, the device ecosystem 104 provides raw and preprocessed signals including, by way of example and not limitation: frame-derived gaze vectors, blink rate, current application focus, foreground window hierarchy, pointer dwell times, tap/scroll cadence, ambient light in lux, ambient sound pressure level in dB, network latency and throughput, and coarse or fine location.

A context-adaptive UI platform 106 is communicatively coupled to the device ecosystem 104 and is configured to orchestrate adaptive interface scenes based on multi-parameter context. In certain embodiments, the platform 106 includes a Context Intelligence Engine configured to ingest signals via signal adapters, normalize heterogeneous measurements to a common scale, assign confidence values per parameter to capture measurement reliability, and apply temporal-decay functions that reduce the influence of stale measurements. The Context Intelligence Engine outputs a context vector whose elements correspond to the normalized parameters and their associated metadata. The platform 106 further includes a Predictive Context Modeling module configured to predict one or more context states for a prediction horizon (for example, the next 1-30 seconds for micro-interactions or the next 1-10 minutes for workflow transitions) and to pre-generate candidate interface scenes for the predicted states. A Scene Selection/Generation pipeline is configured to retrieve a candidate scene from a scene-template library or, when no template sufficiently satisfies the context vector, to dynamically compose a novel scene by selecting UI components, determining a layout hierarchy, and binding data sources. A Seamless Transition Engine is configured to activate a selected interface scene with continuity preservation, for example, by animating between layouts, maintaining in-progress input fields, and preserving focus and scroll position, and to provide a rollback path that reverts to a prior interface scene upon detection of a performance deficiency or user-burden condition. In some embodiments, the platform 106 exposes a cross-device session layer that maintains a continuity token and state replication information to permit handoff of the active interface scene between devices in the device ecosystem 104.

One or more edge devices 108 are communicatively coupled between the device ecosystem 104 and the platform 106. An edge device 108 is configured to provide low-latency inference, scene caching, feature extraction, and privacy-preserving preprocessing proximate to the user. In one example, the edge device 108 performs on-device face-blur masking and down-sampling prior to transmitting frames to the platform 106; in another example, the edge device 108 maintains a short-term scene cache to reduce scene-activation latency when network conditions fluctuate.

One or more data stores 110 are configured to persist interaction logs, feature stores, scene templates, trained model artifacts, and telemetry. The data store 110 may comprise a combination of relational tables and key-value or document stores (for example, SQL databases for metrics, and object storage for model checkpoints and template assets). In some configurations, the data store 110 maintains per-role policy definitions and access-control labels used to filter scene content (for example, nurse-appropriate summaries versus physician-only values).

External multi-parameter context sources 112 are communicatively coupled to the platform 106 and provide enterprise and third-party signals used to enrich the context vector. Examples include: electronic medical record (EMR) systems providing patient acuity, medication schedules, and attending-physician ETA; customer-relationship management (CRM) systems providing account priority and escalation state; calendar and conferencing systems providing meeting start times and participant roles; and workforce-management systems providing staffing levels and skill coverage. In other embodiments, external sources 112 include IoT building sensors reporting room occupancy, temperature, and lighting profiles; maps and transit feeds reporting travel time; and authentication/identity systems reporting user role and privilege.

Figure 1B:
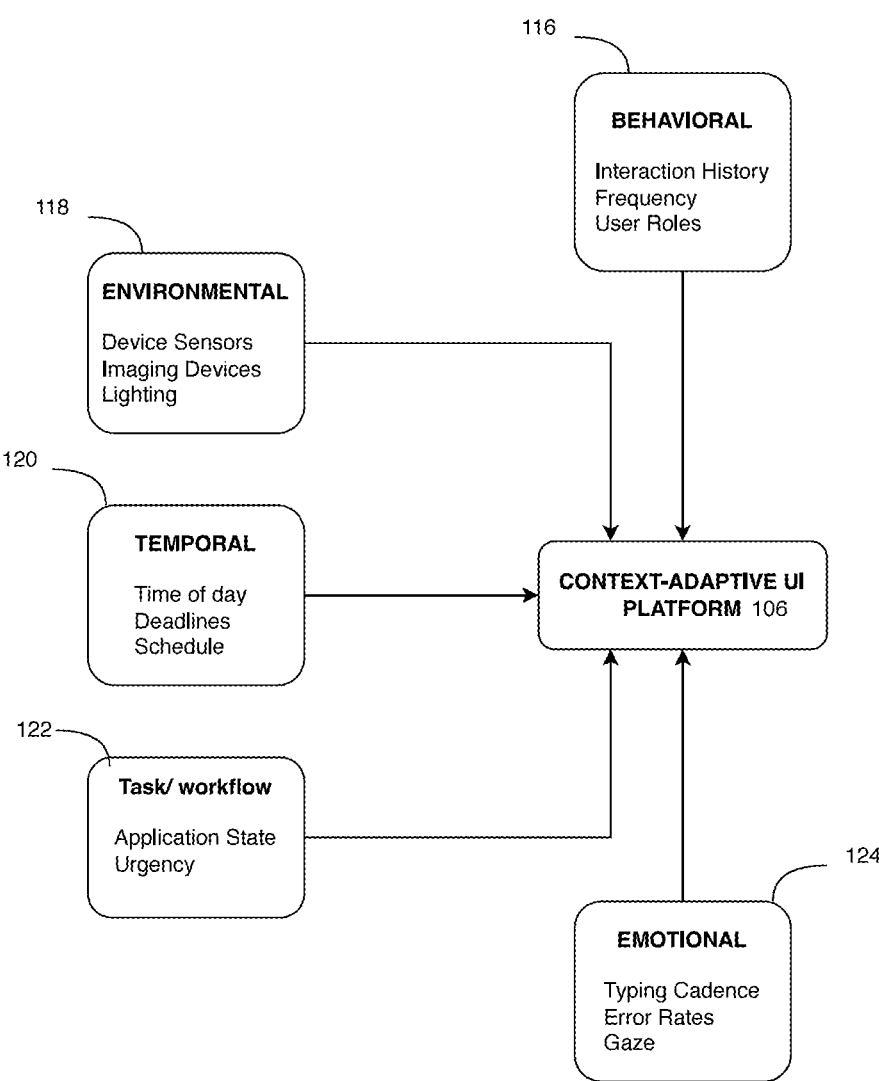
FIG. 1B illustrates a context input acquisition architecture comprising behavioral, environmental, temporal, task/workflow, and emotional input blocks, according to certain embodiments.

FIG. 1B illustrates a context input acquisition architecture of the context-adaptive UI platform 106. The context input acquisition architecture is configured to capture and normalize a plurality of heterogeneous context parameters for subsequent processing by the UI platform 106. The architecture implements a multi-parameter intake, wherein behavioral, environmental, temporal, task/workflow, and emotional categories are continuously monitored and transformed into normalized features and context vectors suitable for predictive modeling, scene generation, and continuity-preserving activation of user interface scenes.

The architecture comprises a behavioral input block 116. The behavioral input block 116 is configured to acquire user-centric interaction and biometric signals. In one embodiment, the behavioral input include historical navigation logs, usage frequency, role-based privileges, and physiological indicators such as heart rate, stress, and gaze fixation obtained from smart glasses or other sensors. For example, in a healthcare configuration, gaze concentration and error rates may be interpreted as signals of clinician cognitive load, whereas in an enterprise configuration, keyboard cadence and multitasking across windows may be used to anticipate imminent task-switching. In further embodiments, wearable inertial data (e.g., posture, stride cadence, or accelerometer traces) is incorporated to detect whether the user is walking or sitting, triggering corresponding adaptations in interface simplicity.

The architecture further comprises an environmental inputs block 118. The environmental inputs block 118 is configured to capture ambient and device-related conditions including device capabilities (e.g., screen size, processor budget, battery level), camera-derived background data, ambient lighting intensity in lux, ambient sound levels in decibels, and network connectivity (e.g., latency, bandwidth, jitter). For example, in a noisy retail pharmacy environment, the environmental inputs 118 may result in activation of larger visual prompts instead of voice notifications; in a dimly lit hospital room, the block 118 may prompt a high-contrast display configuration.

The architecture further comprises a temporal inputs block 120. The temporal inputs block 120 is configured to monitor time-dependent factors such as time of day, day of week, schedule state, and deadline proximity. In one embodiment, the temporal inputs 120 adjust interface emphasis based on the time horizon—for example, morning configurations highlight overnight alerts and deadlines, while evening configurations emphasize daily summaries. In certain configurations, the temporal inputs 120 incorporate a temporal-decay factor to reduce the influence of outdated events, ensuring that stale parameters exert diminishing influence on scene selection.

The architecture further comprises a task and workflow inputs block 122. The task and workflow inputs block 122 is configured to identify the operational state of an application, workflow stage, or task urgency. For example, in a pharmacy workflow, task/workflow inputs 122 may indicate whether the user is in "intake," "verification," or "dispensing" stages of prescription handling. In an enterprise productivity application, task/workflow inputs 122 may distinguish between composing a draft, reviewing contracts, or preparing a presentation. This block provides state tokens and urgency metrics that directly guide interface orchestration.

The architecture further comprises an emotional inputs block 124. The emotional inputs block 124 is configured to infer affective states of a user from indirect interaction features and biometric proxies. In one example, typing errors, input hesitations, or rapid corrections are used as indicators of frustration or stress. In another example, camera-based detection of facial expressions provides emotional state classification such as anxious, calm, or distressed. In healthcare scenarios, the emotional inputs are particularly relevant for activating patient-centric prompts, such as highlighting comfort measures when distress is detected.

In an exemplary pharmacy setting, the behavioral input capture technician and pharmacist interaction cadence, the environmental inputs detect closing-hour lighting levels, the temporal inputs identify shift-end timing, and the task/workflow inputs encode active prescription stages, collectively prompting automatic activation of a pharmacist-only workflow scene. In a hospital setting, the emotional inputs indicating patient distress combined with task/workflow inputs for ongoing care trigger nurse-appropriate comfort prompts, while physician-only information remains suppressed until arrival. In an enterprise configuration, the temporal input indicating regulatory deadlines combined with the behavioral input of an executive's usage pattern prompt prioritization of compliance-related alerts across smart glasses and workstation devices.

Figure 1C:
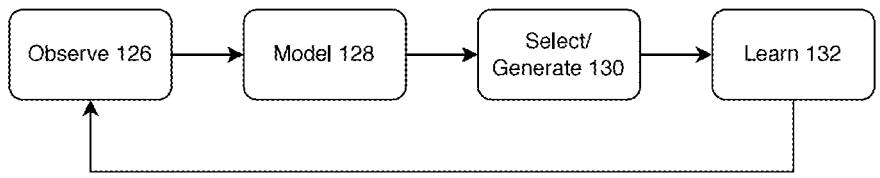
FIG. 1C illustrates a scene lifecycle architecture comprising observe, model, select/generate, and learn stages, according to certain embodiments.

FIG. 1C illustrates a scene lifecycle architecture of the context-adaptive UI platform 106. The scene lifecycle architecture, also referred to as the lifecycle 126-132, is configured to continuously process context signals to generate adaptive user interface scenes, to activate a selected scene with continuity preservation, and to refine future operations through iterative learning. The lifecycle implements a closed-loop sequence comprising observation, modeling, scene selection and generation, and learning, with outputs feeding back into the observation stage to improve predictive accuracy and adaptability over time.

The lifecycle comprises an observe stage 126. The observe stage 126 is configured to continuously capture multi-parameter context inputs, including behavioral, environmental, temporal, task, social, and emotional parameters, as described in FIG. 1B. In one embodiment, the observe stage 126 acquires data streams from sensors integrated into smart glasses, mobile devices, and desktop systems, as well as enterprise data sources such as electronic medical records and customer-relationship management systems. For example, in a healthcare embodiment, the observe stage 126 collects patient distress indicators, ambient noise levels, and nurse shift schedules. In an enterprise embodiment, the observe stage 126 collects email volume, compliance deadlines, and device availability. The observe stage 126 outputs normalized and time-stamped measurements forming a context vector.

The lifecycle further comprises a model stage 128. The model stage 128 is configured to analyze the context vector and to predict one or more context states. In one configuration, the model stage 128 employs machine learning models trained on historical interaction data, implicit feedback, and role-specific policies. The model stage 128 forecasts a probability of context transitions and determining functional requirements in advance of explicit user input. The likelihood of context transitions, in an example, is predicting that a pharmacist will move from technician-assisted workflow to pharmacist-only workflow near closing time, or that a user walking with a mobile device will soon enter a stationary working state. The model stage 128 may further compute confidence scores, utility estimates, and transition probabilities that guide scene pre-generation.

The lifecycle further comprises a select and generate stage 130. The select and generate stage 130 is configured to identify and construct candidate user interface scenes for predicted context states. In one embodiment, the stage 130 queries a library of pre-defined scene templates and selects a template whose parameters match the context vector. In another embodiment, when no suitable template exists, the stage 130 dynamically composes a scene by assembling interface components, arranging layout hierarchies, and binding relevant data streams. The select and generate stage 130 also applies optimization passes on the selected candidate interface scene based on at least one of usability matrices, accessibility constraints, and latency thresholds, performance matrices. The optimization pass constitutes a computational refinement stage configured to evaluate and adjust one or more parameters of the selected scene to improve operational efficiency, usability, and accessibility prior to rendering or deployment. The optimization pass may operate as an automated post-processing routine that analyzes performance and interaction metrics derived from contextual, device-specific, and user-related variables. Examples of optimization passes include, in a hospital scenario, the stage 130 generates a patient-care scene that presents vital signs, medication schedules, and comfort prompts tailored to a nurse's role. In a productivity scenario, the stage 130 generates a pre-meeting scene displaying agenda documents, recent communications, and action items.

The lifecycle further comprises a learn stage 132. The learn stage 132 is configured to evaluate the effectiveness of activated scenes and to update models and parameters for future cycles. The learn stage 132 collects implicit feedback such as task completion time, error rate, input hesitation, and dwell metrics. The learn stage 132 further incorporates A/B testing results, user reversal actions, and performance thresholds into a retraining pipeline. In one embodiment, the learn stage 132 adjusts parameter weights in the context score equation, modifies template selection probabilities, and retrains prediction models using newly acquired data. For example, if an activated pharmacist-only workflow scene results in extended dwell time and higher error rate, the learn stage 132 reduces the confidence in that transition policy and increases rollback probability in subsequent cycles.

The observe stage 126 is operably connected to the learn stage 132, forming a feedback loop. The feedback loop enables continuous refinement of the context acquisition process based on performance evaluation, ensuring that contextual signals are better prioritized, weighted, and filtered in subsequent iterations. This closed-loop design allows the lifecycle 126-132 to adapt over time, providing increasingly accurate predictions, better optimized scenes, and improved continuity of user interaction across devices.

In exemplary configurations, the lifecycle operates in multiple domains. In a pharmacy environment, the lifecycle observes staffing levels and queue lengths, models the shift to pharmacist-only workflow, generates corresponding streamlined scenes, and learns from efficiency outcomes. In a hospital environment, the lifecycle observes patient distress and physician ETA, models a comfort-care requirement, generates a nurse-facing scene, and learns from observed task completion improvements. In enterprise productivity, the lifecycle observes regulatory deadlines and task cadence, models imminent document review needs, generates a compliance scene across devices, and learns from user interaction logs to refine priority policies.

High-Level System Architecture

Figure 2A:
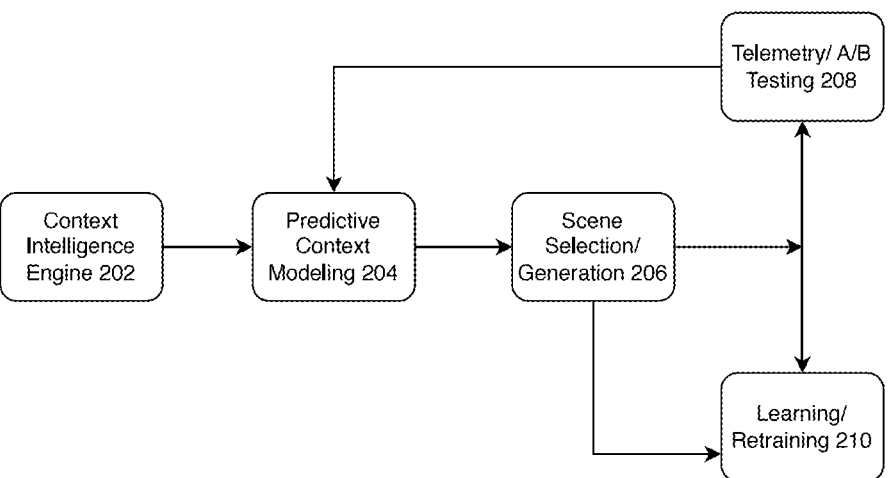
FIG. 2A illustrates a platform-level architecture including a context intelligence engine, predictive context modeling, scene selection, telemetry, and retraining, according to certain embodiments.

FIG. 2A illustrates a platform-level architecture of a multi-parameter context analysis system. The platform-level architecture, also referred to as the system 200, is configured to process heterogeneous context parameters, forecast upcoming context states, generate and activate adaptive interface scenes, and continuously improve through telemetry-driven learning. The system 200 implements a modular pipeline comprising context intelligence, predictive modeling, scene generation, telemetry capture, and retraining. The combination of these modules enables real-time, predictive, and continuity-preserving orchestration of user interfaces across multiple devices.

The system comprises a Context Intelligence Engine 202. The Context Intelligence Engine 202 is configured to acquire and normalize a plurality of context inputs, including behavioral, environmental, temporal, task/workflow, and emotional parameters as described with respect to FIG. 1B.

The system further comprises a Predictive Context Modeling module 204. The Predictive Context Modeling module 204 is configured to predict one or more context states based on the context vector produced by the Context Intelligence Engine 202. In one embodiment, the Predictive Context Modeling module 204 employs machine learning models trained on historical usage logs and feedback signals to predict transitions such as a clinician moving from patient intake to medication verification, or a mobile user transitioning from walking to stationary work. The module Predictive Context Modeling module 204 generates probability distributions over potential next contexts, assigns confidence levels, and identifies user needs before they are explicitly requested. The Predictive Context Modeling module 204 further maintains a pre-generation cache in which candidate interface scenes corresponding to likely transitions are composed ahead of time.

The system further comprises a Scene Selection and Generation module 206. The Scene Selection and Generation module 206 is configured to retrieve or compose candidate interface scenes based on the predicted context states. In one embodiment, the Scene Selection and Generation module 206 queries a library of pre-defined scene templates and selects the closest matching template. In another embodiment, when no template is suitable, the Scene Selection and Generation module 206 dynamically generates a new scene by assembling user interface components, determining layout hierarchies, and binding application data. Optimization passes are applied to ensure usability, accessibility, and performance. For example, in a pharmacy workflow, the Scene Selection and Generation module 206 generates a pharmacist-only scene when staffing context indicates technician absence; in an enterprise workflow, the Scene Selection and Generation module 206 generates a compliance-preparation scene containing regulatory alerts, meeting documents, and prioritized emails.

The system further comprises a Telemetry and A/B Testing module 208. The Telemetry and A/B Testing module 208 is configured to capture implicit and explicit feedback from activated scenes, including task completion time, error rate, dwell time, interaction paths, and rollback events. The Telemetry and A/B Testing module 208 may also assign users into A/B test groups to compare interface variants, collecting comparative metrics on effectiveness and user burden. In one embodiment, the Telemetry and A/B Testing module 208 operates continuously in the background, transmitting telemetry data to secure storage and ensuring privacy compliance through anonymization and aggregation.

The system further comprises a Learning and Retraining module 210. The Learning and Retraining module 210 is configured to update models, weights, and scene policies based on telemetry data received from the Telemetry and A/B Testing module 208. In one embodiment, the Learning and Retraining module 210 retrains predictive models with new interaction logs, updates the weight parameters used in the context score equation, and modifies scene templates based on observed performance. For example, if the Telemetry and A/B Testing module 208 detects increased task-completion times in a newly generated workflow, the Learning and Retraining module 210 adjusts feature weights to reduce likelihood of reselecting the same scene design. In another embodiment, the Telemetry and A/B Testing module 208 initiates rollback policy tuning such that low-performing scenes are rapidly deprecated in favor of more effective alternatives.

The Telemetry and A/B Testing module 208 and the Learning and Retraining module 210 form a feedback loop that supplies continuous improvements to both the Predictive Context Modeling module 204 and the Scene Selection/Generation module 206. This closed-loop architecture ensures that predictions, generated scenes, and transition policies become more accurate and context-sensitive over time.

Figure 2B:
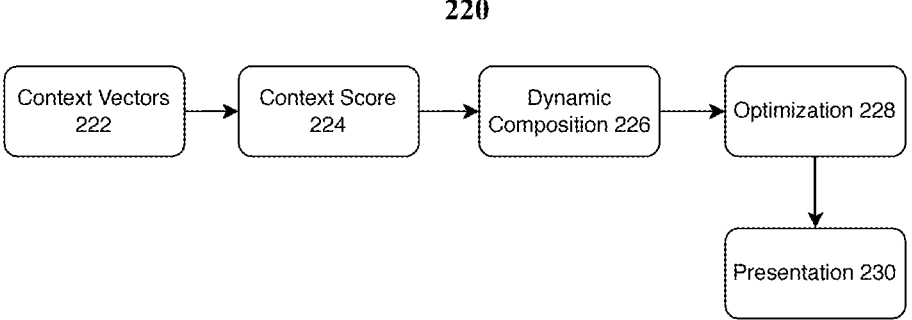
FIG. 2B illustrates a dataflow pipeline for inference from context vectors to presentation, according to certain embodiments.

FIG. 2B illustrates a dataflow pipeline of the multi-parameter context analysis system. The dataflow pipeline, also referred to as pipeline 220, is configured to transform processed context vectors into optimized user interface scenes for presentation on one or more devices.

The pipeline 220 comprises a context vectors block 222. The context vectors block 222 receives normalized context vectors generated by the Context Intelligence Engine 202, as described in FIG. 1B.

The pipeline 220 further comprises a context score block 224. The context score block 224 applies the scoring mechanism previously described with respect to FIG. 1B to evaluate the relative influence of the various parameters in the context vector. The output of block 224 serves as a decision signal for scene composition.

The pipeline 220 further comprises a dynamic composition block 226. The dynamic composition block 226 generates candidate user interface scenes based on the computed score and vector attributes. When a suitable scene template exists, block 226 retrieves it; when no suitable template is available, the block dynamically composes a novel scene by assembling components, determining layout, and binding associated data.

The pipeline 220 further comprises an optimization block 228. The optimization block 228 is configured to apply performance, usability, and accessibility checks to the candidate scene. Examples include minimizing rendering latency, adapting component size for mobile use, or adjusting layouts for low-vision accessibility.

The pipeline 220 further comprises a presentation block 230. The presentation block 230 activates the selected and optimized scene on a target device within the device ecosystem 104. The presentation may include continuity-preserving transitions, ensuring that ongoing user tasks are not interrupted.

Figure 2C:
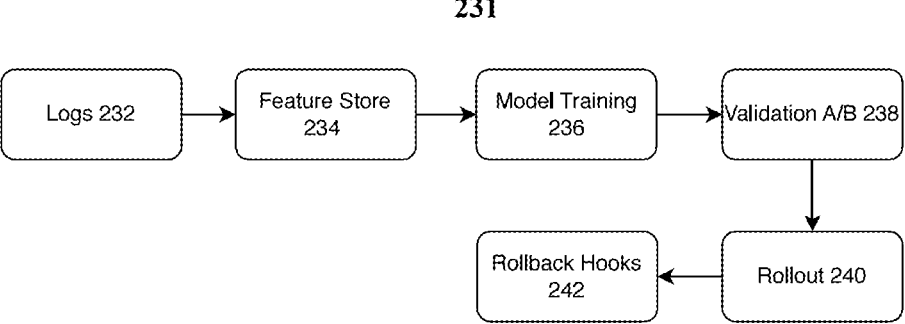
FIG. 2C illustrates a retraining pipeline including logs, feature store, model training, validation, rollout, and rollback, according to certain embodiments.

FIG. 2C illustrates a retraining pipeline of the multi-parameter context analysis system. The retraining pipeline, also referred to as pipeline 231, is configured to update predictive models and scene policies using telemetry data captured during runtime.

The pipeline 231 comprises a logs block 232. The logs block 232 collects session telemetry as described with respect to FIG. 2A, including user interactions, completion rates, error events, and rollback triggers.

The pipeline 231 further comprises a feature store block 234. The feature store block 234 transforms raw logs into structured features that can be used for training machine learning models. Features may be aggregated across users, anonymized, and stored for temporal alignment.

The pipeline 231 further comprises a model training block 236. The model training block 236 is configured to retrain predictive context models, scene-selection policies, and scoring weights using the features in block 234.

The pipeline 231 further comprises a validation and A/B testing block 238. The validation and A/B testing block 238 evaluates new models against baseline models, using offline metrics and live user experiments. In one embodiment, subsets of users are assigned to experimental models to measure real-world improvements in task efficiency and usability.

The pipeline 231 further comprises a rollout block 240. The rollout block 240 deploys validated models and scene policies to production environments of the system 200. Rollout may occur gradually or in staged phases.

The pipeline 231 further comprises rollback hooks 242. The rollback hooks 242 are configured to revert deployments if validation or live telemetry indicates degraded performance. For example, if a new model increases task completion time, rollback hooks 242 restore the prior version to maintain service quality.

System Architecture

Figure 3:
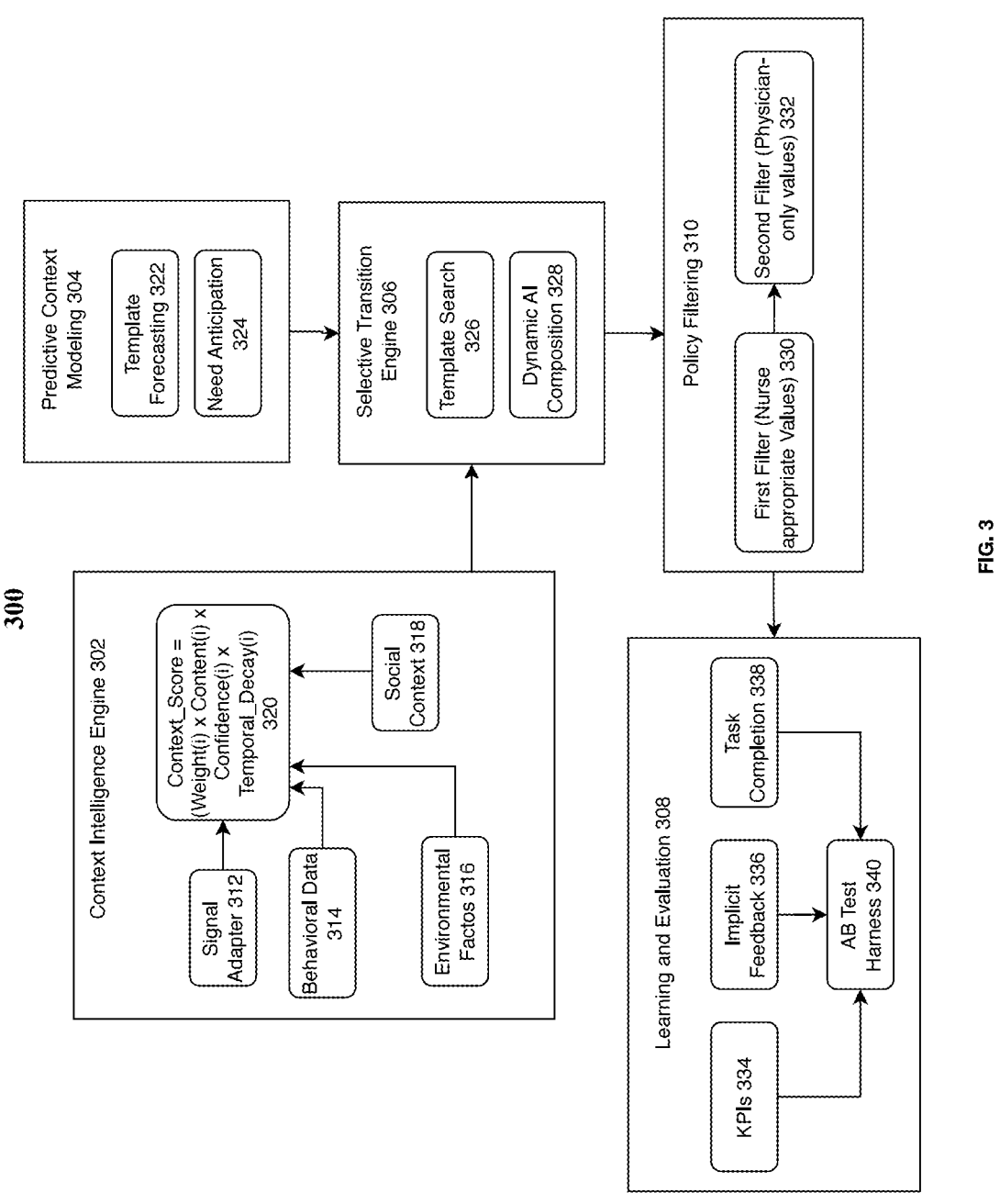
FIG. 3 illustrates a system architecture including context intelligence, predictive modeling, selective transition, learning and evaluation, and policy filtering, according to certain embodiments.

FIG. 3 illustrates a system architecture for predictive scene-based user interface orchestration. The system architecture, also referred to as the architecture, is configured to acquire a plurality of context parameters, generate a context vector with confidence scores and temporal-decay values, compute a context score by applying a weighted aggregation, predict one or more context states, pre-generate candidate interface scenes, select a candidate interface scene under a transition policy that enforces continuity preservation, and continuously improve operation using feedback and testing. The architecture 300 comprises a Context Intelligence Engine 302, a Predictive Context Modeling engine 304, a Selective Transition Engine 306, a Learning and Evaluation engine 308, and a Policy Filtering module 310.

The architecture comprises the Context Intelligence Engine 302. The Context Intelligence Engine 302 is configured to interface with a signal adapter 312 to receive heterogeneous signals and to normalize sensor data originating from devices, peripherals, and external systems. The Context Intelligence Engine 302 acquires behavioral data 314, environmental factors 316, and social context 318, and, in further embodiments, temporal parameters, task-related indicators, emotional indicators, and device-ecosystem availability, and generates from the plurality of context parameters a context vector comprising values of the parameters together with corresponding confidence scores and temporal-decay values. The Context Intelligence Engine 302 computes a context score 320 by applying a weighted aggregation of the values, confidence scores, and temporal-decay values according to:

$$Context\_Score = i\Sigma(Weight_i \times Context\_Parameter_i \times Confidence_i \times Temporal\_Decay_i)$$

Where $Weight_i$ represents the learned importance of a parameter, $Context\_Parameter_i$ represents the normalized value, $Confidence_i$ denotes measurement reliability, and Temporal_Decay$_i$ adjusts the influence of stale signals. In one embodiment, the Context Intelligence Engine 202 operates across distributed nodes, wherein signal adapters on wearable devices perform pre-processing and edge devices compute normalized values before forwarding them to cloud instances for aggregation.

By way of illustration, behavioral data 314 may include historical interaction logs, user role information, heart rate, stress indicators, and eye-tracking signals; environmental factors 316 may include device capabilities, camera input, ambient lighting, ambient noise, and network connectivity; and social signals 318 may include collaborative indicators, organizational hierarchy, and presence state. Confidence scores reflect measurement reliability (for example, sensor health or API provenance) and temporal-decay values reduce the influence of stale measurements.

The architecture further comprises the Predictive Context Modeling engine 304. The Predictive Context Modeling engine 304 is configured to predict, using a machine learning model, one or more context states based on the context vector produced by the Context Intelligence Engine 302. The Predictive Context Modeling engine 304 includes a template forecasting module 322 configured to estimate which scene templates are likely to fulfil an upcoming context, and a need anticipation module 324 configured to anticipate functional requirements prior to explicit user requests. Illustratively, template forecasting 322 may predict that a pharmacist will move from technician-assisted verification to pharmacist-only verification near closing time; need anticipation 324 may infer that a clinician will require a concise care summary and medication schedule upon detecting patient distress.

The architecture further comprises the Selective Transition Engine 306. The Selective Transition Engine 306 is configured to pre-generate, for the one or more predicted context states, a plurality of candidate interface scenes and to select a candidate interface scene by applying a transition policy that enforces continuity preservation across interface states. The Selective Transition Engine 306 includes a template search module 326 configured to query a scene library for templates corresponding to the predicted context, and a dynamic AI composition module 328 configured to generate a new interface scene including layout structures, interaction flows, and component hierarchies when no matching template exists. The transition policy specifies confidence thresholds for prediction confidence and task utility metric, such that activation occurs only when predefined conditions are satisfied; continuity preservation includes maintaining user mental models and application state during a cinematic transition, and a rollback procedure is available to revert to a previously active interface scene upon detection that the selected candidate interface scene does not fulfil a performance criterion. The cinematic transition is executed only when the confidence threshold and utility metric fulfil predefined conditions. The predefined conditions constitute quantitative thresholds and logical criteria configured to ensure that activation of a candidate interface scene occurs only under reliable, contextually appropriate, and performance-compliant circumstances. The predefined conditions may include a prediction confidence threshold representing a minimum probability level at which the predictive context modeling engine determines that a forthcoming context state is valid. The predefined conditions may further include a task utility threshold defining a minimum utility score associated with the expected benefit or efficiency of the candidate interface scene relative to the user's current workflow objective. The utility score may be computed from parameters such as task relevance, completion efficiency, latency performance, and accessibility compliance.

In some configurations, the Selective Transition Engine 306 interoperates with a synchronization layer to transmit a synchronization token representing the active scene and context vector to a companion device, such as a wearable device, workstation, or mobile device, to provide seamless cross-device continuity of user interaction.

The architecture further comprises the Policy Filtering module 310. The Policy Filtering module 310 is configured to apply role-aware filtering to a rendered or selected candidate interface scene to display user-appropriate information while suppressing information reserved for a different role. In one illustration, a first filter 330 presents nurse-appropriate values, such as vitals and care prompts, while a second filter 332 enables physician-only values, such as detailed laboratory metrics, when an authorized physician is detected. Policy Filtering 310 may consult stored role policies and data-access rules to enforce restrictions consistently across devices.

The architecture further comprises the Learning and Evaluation engine 308. The Learning and Evaluation engine 308 is configured to receive implicit user feedback, conduct automated A/B testing, track performance metric telemetry, and retrain predictive models. The Learning and Evaluation engine 308 includes a KPIs module 334 configured to track task-oriented metrics such as completion time, error rate, and dwell time; an implicit feedback module 336 configured to observe reversal actions, abandonment, and hesitation; a task completion module 338 configured to evaluate workflow progress and success; and an A/B test harness 340 configured to assign experiment variants and collect comparative results. Outputs of the Learning and Evaluation engine 308 are used to continuously retrain the machine learning model in the Predictive Context Modeling engine 304, to update weights, confidence handling, and temporal-decay parameters in the Context Intelligence Engine 302, and to adjust transition policy thresholds in the Selective Transition Engine 306, thereby improving predictive accuracy, candidate scene quality, and continuity behavior over time.

In operation, the system architecture acquires the plurality of context parameters at the Context Intelligence Engine 302, generates the context vector and computes the context score 320, predicts one or more context states at the Predictive Context Modeling engine 304, pre-generates and searches candidate scenes at the Selective Transition Engine 306, applies role-aware filtering at the Policy Filtering module 310, and evaluates outcomes at the Learning and Evaluation engine 308 to enable continuous adaptation. The logical boundaries and data flows depicted in FIG. 3 are illustrative and non-limiting; individual modules may be combined, subdivided, or distributed across wearable devices, smartphones, tablet computers, laptop computers, desktop workstations, and other companion devices without departing from the described operation.

Ecosystem

Figure 4:
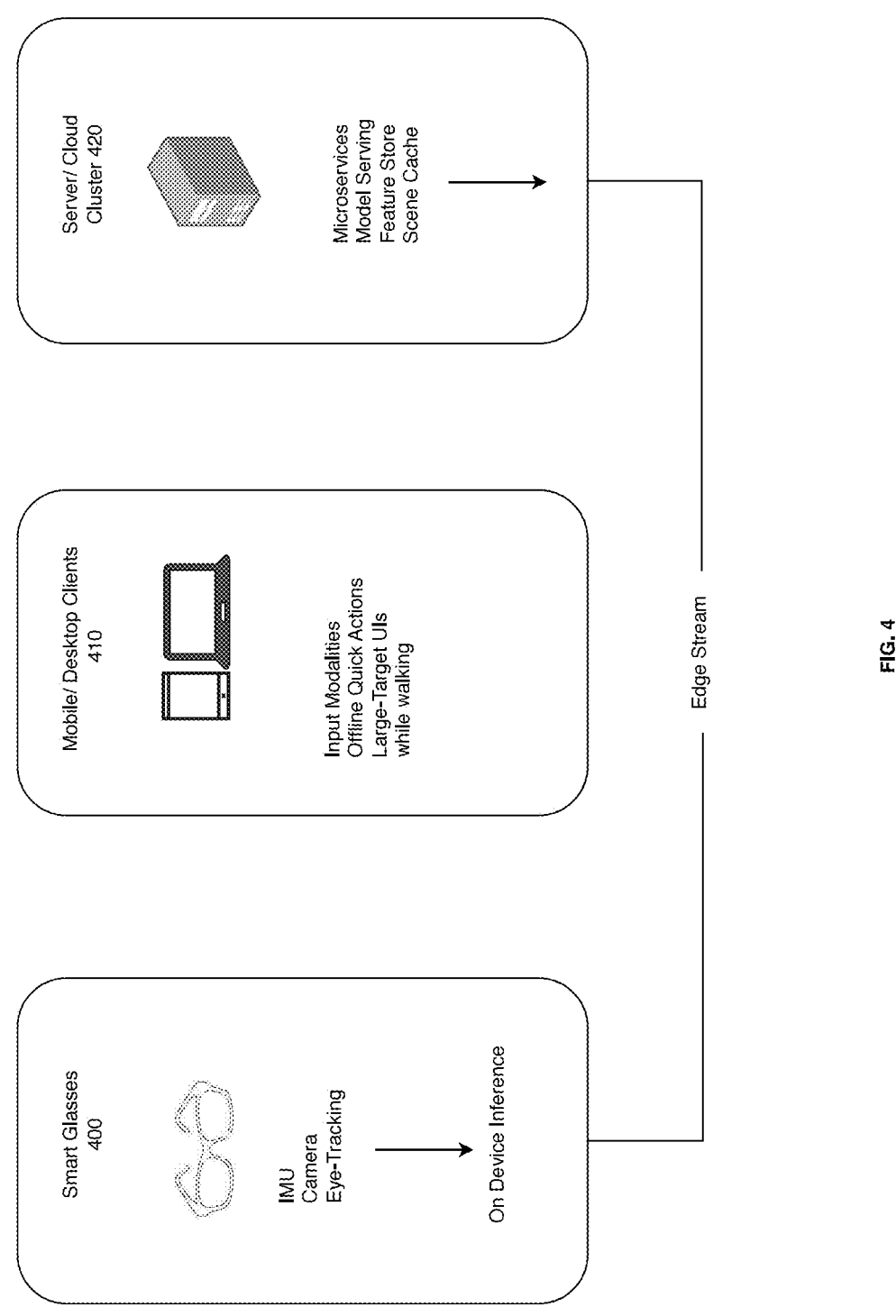
FIG. 4 illustrates a device and server ecosystem including smart glasses, mobile/desktop clients, and a cloud cluster, according to certain embodiments.

FIG. 4 illustrates a device and server ecosystem for implementing predictive scene-based user interface orchestration. The device and server ecosystem, also referred to as the ecosystem of FIG. 4, is configured to support acquisition of context parameters, on-device inference, cross-device interaction, and cloud-based orchestration services. The ecosystem comprises smart glasses 400, mobile/desktop clients 410, and a server/cloud cluster 420, interconnected by an edge stream for context and scene data exchange.

The ecosystem comprises smart glasses 400. The smart glasses 400 include sensors and modules such as an inertial measurement unit (IMU), one or more cameras, and an eye-tracking subsystem. These sensors are configured to capture fine-grained behavioral and environmental parameters, including gaze fixation, head movement, and ambient visual conditions. The smart glasses 400 further include on-device inference capabilities, enabling pre-processing of captured signals into features such as fixation duration, blink frequency, stride patterns, and gesture recognition. In one example, the smart glasses 400 detect prolonged fixation on a patient's monitor and transmit a signal indicating high attentional load. In another example, the smart glasses 400 detect walking motion using IMU traces and automatically simplify the user interface to provide large interaction targets.

The ecosystem further comprises mobile and desktop clients 410. The mobile/desktop clients 410 are configured to provide primary interaction surfaces for predictive scenes. These clients support multiple input modalities including touch, keyboard, mouse, and voice input. In one embodiment, the clients 410 provide offline quick actions, such as enabling form entry or task completion without requiring active network connectivity. In another embodiment, when the device detects user mobility (e.g., walking with a smartphone), the client activates large-target user interfaces, increasing tap precision and minimizing input errors. Examples include simplified navigation buttons during commuting or gesture-driven interactions for multitasking.

The ecosystem further comprises a server/cloud cluster 420. The server/cloud cluster 420 is configured to host orchestration services and backend pipelines supporting predictive modeling and scene generation. The server/cloud cluster 420 includes microservices that encapsulate specialized functions such as data normalization, policy enforcement, and telemetry ingestion; a model serving framework to deploy and execute predictive models trained on historical data; a feature store for storing and retrieving engineered features derived from logs and sensor inputs; and a scene cache to store pre-generated interface scenes for rapid activation. In one configuration, the server/cloud cluster 420 retrieves features from distributed devices, computes context scores at scale, and synchronizes candidate scenes back to the clients for continuity-preserving activation.

The smart glasses 400, mobile/desktop clients 410, and server/cloud cluster 420 interoperate through the edge stream. The edge stream provides a low-latency communication channel enabling transfer of context vectors, synchronization tokens, and pre-generated scene descriptors between local devices and cloud services. In various embodiments, the edge stream supports protocols such as WebRTC, gRPC, or MQTT for efficient, secure, and scalable synchronization.

Workflow and Pipeline

FIG. 5 illustrates exemplary use case workflows 500 for predictive scene-based orchestration in different domains. The workflows include pharmacy automation 502, hospital scenarios 504, and executive productivity 506. Each workflow demonstrates the automatic switching, filtering, and continuity features enabled by the system architecture of FIG. 3 and the device ecosystem of FIG. 4.

The workflows comprise pharmacy automation 502. The pharmacy automation 502 includes a staffing and time context module 508 configured to monitor staffing levels, technician availability, and time-of-day parameters. Based on this input, an auto-switch module 510 transitions between a technician-assisted workflow 512 and a pharmacist-only workflow 514. The transition occurs without manual mode selection, preserving continuity while adapting to contextual needs. The pharmacy automation 502 further includes an automatic call module 516 configured to trigger context-appropriate notifications, such as escalating a pharmacist verification request when technician support is unavailable.

The workflows further comprise hospital scenarios 504. The hospital scenarios 504 include a visual patient state recognition module 518 configured to detect patient distress, anxiety, or agitation using camera inputs or physiological signals. A role-appropriate information filtering module 520 ensures that nurse-facing displays present care summaries, vital signs, and comfort measures, while physician-only values remain suppressed until an attending physician arrives. A predictive prompts module 522 generates anticipatory guidance, such as suggesting comfort-care interventions or alerting nurses of upcoming tasks while waiting for physician consultation.

The workflows further comprise executive productivity 506. The executive productivity 506 includes a prioritization module 524 configured to rank communications and tasks based on urgency, compliance deadlines, and user context. The prioritization module 524 directs inputs to mail handling 526 and call management 528, ensuring urgent communications are surfaced first. A cross-application continuity module 530 is configured to preserve task state across multiple applications, enabling an executive to switch from email review to call handling while maintaining document context. A productivity workflow module 532 orchestrates the overall sequence, ensuring that urgent compliance tasks are highlighted, less critical communications are deferred, and ongoing tasks are seamlessly resumed after interruptions.

Figure 6:
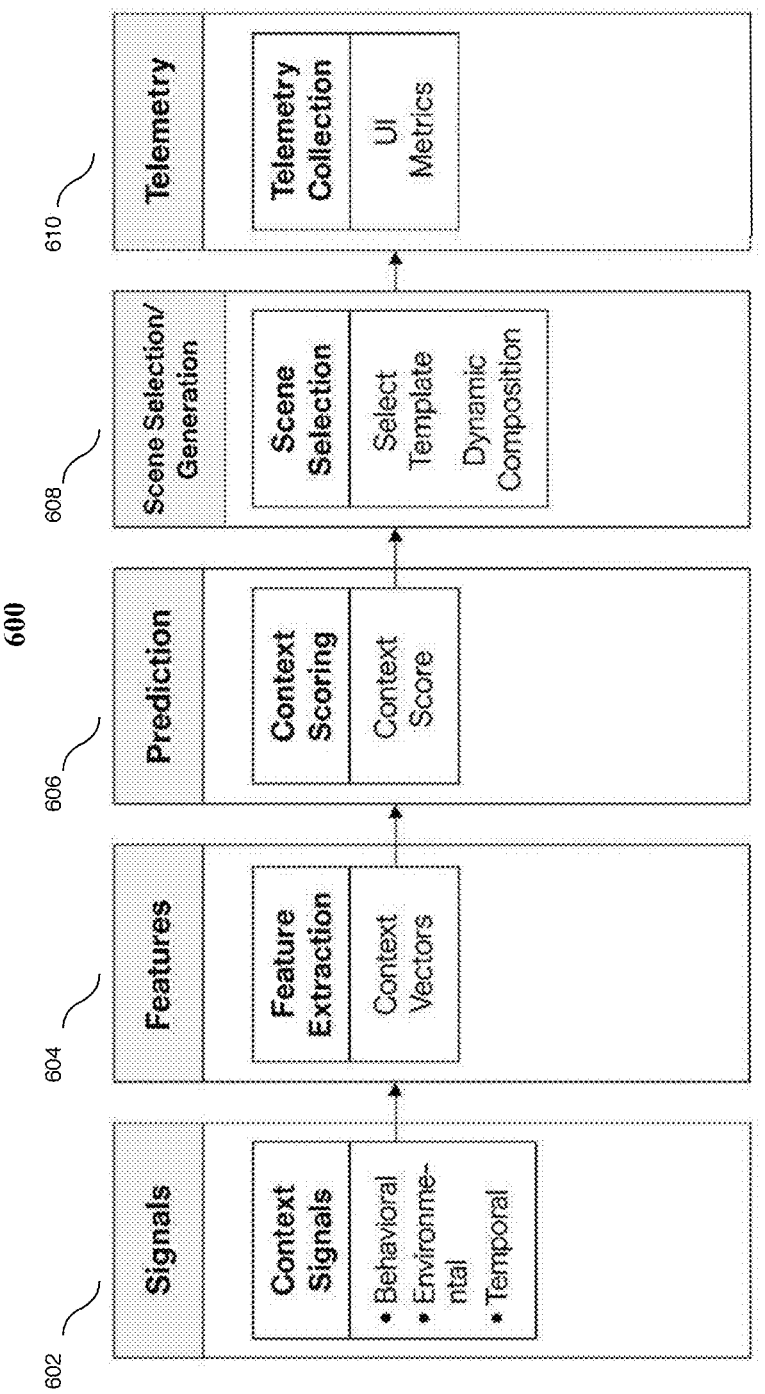
FIG. 6 illustrates an end-to-end processing pipeline from signals to telemetry collection, according to certain embodiments.

FIG. 6 illustrates an end-to-end processing pipeline 600 of the multi-parameter context analysis system. The pipeline 600, also referred to as the pipeline 600, is configured to acquire context signals, extract features, compute predictions, select or generate interface scenes, and collect telemetry for continuous learning. The pipeline 600 is organized into stages including a signals stage 602, a features stage 604, a prediction stage 606, a scene selection and generation stage 608, and a telemetry stage 610.

The pipeline 600 comprises the signals stage 602. The signals stage 602 is configured to acquire raw context signals, including behavioral parameters, environmental parameters, and temporal parameters. Behavioral parameters may include user role, interaction cadence, physiological indicators, and eye-tracking signals. Environmental parameters may include device capability, camera-derived lighting conditions, ambient noise, or network bandwidth. Temporal parameters may include time-of-day, schedule deadlines, and event proximity. These signals are acquired via the Context Intelligence Engine 302 as described in FIG. 3 and normalized by signal adapters into structured input.

The pipeline 600 further comprises the features stage 604. The features stage 604 is configured to perform feature extraction on the acquired signals to produce context vectors. The context vectors are structured representations of multi-parameter state including normalized values, confidence scores, and temporal-decay values, as generated in the Context Intelligence Engine 302. The context vectors serve as intermediate features for predictive modeling.

The pipeline 600 further comprises the prediction stage 606. The prediction stage 606 is configured to compute a context score from the context vector and to apply predictive modeling to forecast upcoming context states. The context score aggregates normalized parameter values, confidence scores, and temporal-decay factors, providing a scalar representation of contextual salience. Predictive modeling, executed in the Predictive Context Modeling engine 304, estimates future states and determines functional requirements prior to explicit user requests.

The pipeline 600 further comprises the scene selection and generation stage 608. The scene selection and generation stage 608 is configured to determine one or more candidate interface scenes corresponding to the predicted context state. The stage 608 includes template selection, wherein a matching scene template is retrieved from a scene library, and dynamic composition, wherein a novel interface scene is generated by assembling layout structures and interaction flows when no suitable template exists. The scene selection and generation stage 608 corresponds to the Selective Transition Engine 306 of FIG. 3.

The pipeline 600 further comprises the telemetry stage 610. The telemetry stage 610 is configured to collect performance and user-interaction metrics from the deployed scene. Collected telemetry includes user interface metrics such as task completion time, error rates, reversal frequency, and dwell time. The telemetry stage 610 corresponds to the Learning and Evaluation engine 308 of FIG. 3 and supplies signals to the retraining pipeline described with respect to FIG. 2C.

Method

Figure 7:
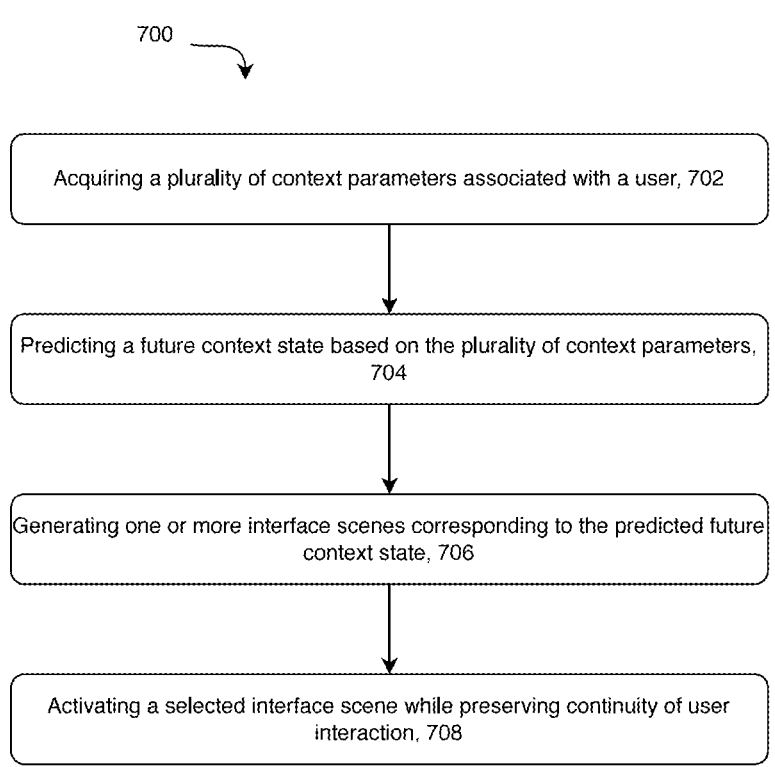
FIG. 7 illustrates a method for predictive scene-based user interface orchestration, according to certain embodiments.

FIG. 7 illustrates a method 700 for predictive scene-based user interface orchestration. The method 700, also referred to as the method 700, is implemented at one or more processors of the multi-parameter context analysis system, coupled to a memory and a plurality of sensors. The method 700 comprises steps of acquiring context parameters, predicting context states, generating candidate interface scenes, and activating a selected interface scene with continuity preservation.

The method 700 begins at step 702, acquiring a plurality of context parameters associated with a user. The plurality of context parameters include behavioral, environmental, temporal, task-related, social, emotional, and device-ecosystem parameters. Acquisition occurs through the Context Intelligence Engine 302 and its signal adapters 312, which normalize raw sensor signals into structured parameter values with confidence scores and temporal-decay values, as illustrated in FIG. 3.

The method 700 continues at step 704, predicting a context state based on the plurality of context parameters. Prediction occurs within the Predictive Context Modeling engine 304, which employs forecasting and need anticipation to estimate transitions and functional requirements. For example, prediction may identify that a user walking with smart glasses is about to enter a stationary work session, or that a pharmacist is transitioning from technician-assisted to pharmacist-only workflow.

The method 700 continues at step 706, generating one or more interface scenes corresponding to the predicted context state. Scene generation occurs within the Selective Transition Engine 306, which performs template search 326 to identify suitable library scenes, and dynamic AI composition 328 to assemble new layouts when templates are insufficient. Generated scenes may include layout structures, interaction flows, and component hierarchies aligned with the predicted state.

The method 700 concludes at step 708, activating a selected interface scene while preserving continuity of user interaction. Activation includes applying a transition policy that enforces continuity preservation across interface states, performing cinematic transitions that maintain the user's mental model, and preserving in-progress state. In the event a selected scene fails to fulfil a performance criterion, rollback procedures revert to the previously active scene, as managed by the Selective Transition Engine 306 and Learning and Evaluation engine 308. Synchronization with companion devices, such as smart glasses 400, mobile clients 410, or server clusters 420 of FIG. 4, ensures continuity across the device ecosystem.

FIG. 8 illustrates a method 800 for predictive scene-based user interface orchestration. The method 800, also referred to as the method 800, is configured to acquire context parameters, compute context vectors and scores, predict context states, pre-generate candidate scenes, and activate scenes with continuity preservation across devices.

The method 800 begins with acquiring a plurality of context parameters. The plurality of context parameters include behavioral data, environmental factors, temporal parameters, task-related indicators, social signals, emotional indicators, and device-ecosystem availability. These parameters are acquired through the Context Intelligence Engine 302 of FIG. 3, which interfaces with signal adapters to normalize raw sensor and system inputs.

The method 800 continues with generating, from the plurality of context parameters, a context vector comprising values of the parameters together with corresponding confidence scores and temporal-decay values. The context vector is produced by the Context Intelligence Engine 302, which applies normalization and metadata tagging to prepare the parameters for scoring.

The method 800 further includes computing a context score by applying a weighted aggregation of the values, confidence scores, and temporal-decay values. The context score corresponds to the computation illustrated in FIG. 3, and provides a scalar indicator of contextual salience.

The method 800 further includes predicting, using a machine learning model, one or more predicted context states based on the context vector. This prediction is performed by the Predictive Context Modeling engine 304, which includes forecasting and need anticipation modules.

The method 800 further includes pre-generating, for the one or more predicted context states, a plurality of candidate interface scenes comprising layout structures, interaction flows, and component hierarchies. This pre-generation is carried out by the Selective Transition Engine 306 of FIG. 3, which queries a scene library or dynamically composes scenes.

The method 800 further includes selecting a candidate interface scene by applying a transition policy that enforces continuity preservation across interface states. This step ensures that user workflows are maintained and that continuity is preserved during transitions.

The method 800 further includes rendering the selected candidate interface scene on a display device, the rendering comprising a cinematic transition that maintains user mental models and application state. The rendering corresponds to the continuity-preserving activation described with respect to FIG. 3 and FIG. 6.

The method 800 further includes, upon detection that the selected candidate interface scene does not fulfil a performance criterion, reverting to a previously active interface scene using a rollback procedure. This rollback mechanism is implemented by the Selective Transition Engine 306 in cooperation with telemetry collection.

The method 800 concludes with synchronizing the selected candidate interface scene with a companion device to maintain cross-device continuity of user interaction.

Companion devices may include smart glasses 400, mobile clients 410, or workstations 420, as described in FIG. 4.

FIG. 9 illustrates a method 900 for predictive scene orchestration in a hospital scenario using smart glasses. The method 900, also referred to as the method 900, is configured to capture real-time patient context, generate predictive interface scenes, apply role-based filtering, and update rendered displays in response to changing conditions.

The method 900 begins at step 902, capturing real-time visual input of a patient at a smart-glasses device worn by a user. The smart glasses 400 of FIG. 4 provide input from a camera and eye-tracking subsystem to capture patient state cues.

The method 900 continues at step 904, transmitting the visual input to a Context Intelligence Engine executing on a host processor. The Context Intelligence Engine 302 normalizes input and prepares it for vector generation.

The method 900 further includes step 906, generating a context vector comprising at least patient state derived from the visual input, temporal context, staffing context, and workflow context. The vector includes values, confidence scores, and temporal-decay parameters.

The method 900 further includes step 908, computing a context score from the context vector using weighted aggregation of values with confidence and temporal-decay parameters. The context score corresponds to the Context_Score computation described in FIG. 3.

The method 900 further includes step 910, predicting a subsequent context state of the patient interaction and pre-generating an interface scene corresponding to the predicted state. The Predictive Context Modeling engine 304 forecasts transitions such as physician arrival or urgent care escalation.

The method 900 further includes step 912, rendering, on the smart-glasses display, the pre-generated interface scene comprising a prioritized patient care summary, medication schedule, and comfort prompts. The rendering ensures task continuity and rapid access to information.

The method 900 further includes step 914, applying a role-based filtering policy to display nurse-appropriate information while suppressing physician-only information. The Policy Filtering module 310 ensures compliance with role boundaries.

The method 900 concludes at step 916 with automatically updating the rendered interface scene in response to changes in patient state, staffing availability, or physician arrival time. This ensures that the displayed scene remains accurate and aligned with real-time hospital workflows.

FIG. 10 illustrates a method 1000 for predictive scene orchestration in a pharmacy workflow. The method 1000, also referred to as the method 1000, is configured to determine workflow mode based on staffing and temporal context, pre-generate interface scenes, and render role-appropriate workflows without manual intervention.

The method 1000 begins at step 1002, receiving, at a Context Intelligence Engine, inputs comprising staffing availability, time of day, and visual input from smart-glasses worn by a pharmacist. The Context Intelligence Engine 302 processes and normalizes these inputs.

The method 1000 continues at step 1004, generating a context vector comprising staffing context, temporal context, and workflow context. The vector includes values, confidence scores, and temporal-decay parameters.

The method 1000 further includes step 1006, predicting whether the pharmacy workflow should proceed in a technician-assisted mode or a pharmacist-only mode. The prediction is carried out by the Predictive Context Modeling engine 304.

The method 1000 further includes step 1008, pre-generating an interface scene for the predicted workflow mode. The Selective Transition Engine 306 queries templates or dynamically composes workflows.

The method 1000 further includes step 1010, rendering, in technician-assisted mode, an interface scene that assigns patient intake, insurance verification, and prescription filling to a technician and assigns verification to the pharmacist. The rendered scene maintains continuity across user roles.

The method 1000 further includes step 1012, rendering, in pharmacist-only mode, an interface scene that consolidates intake, insurance verification, filling, and verification tasks into a streamlined workflow. This automatic switching removes the need for manual mode selection and adapts to staffing constraints in real time.

Artificial Intelligence System Implementation

The system described in conjunction with FIG. 3 comprises one or more subsystems based on Artificial Intelligence. Implementation of the subsystems based on the Artificial Subsystems is illustrated by FIGS. 11 to 20.

Some implementations of the technology disclosed relate to using a Transformer model to provide an AI system. In particular, the technology disclosed proposes a parallel input, parallel output (PIPO) AI system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLaMA versions, BERT, Span-BERT, ROBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-Deep-Lab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, VITB/16-FRCNN, ViT-B/16-FRCNN, PVT-Small+RetinaNet, Swin-T+Retina-Net, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 11:
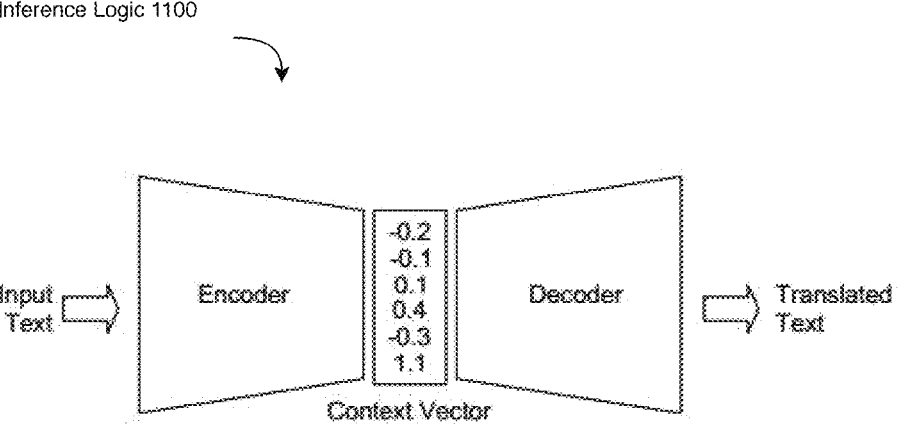
FIG. 11 is a schematic representation of an encoder-decoder architecture.

FIG. 11 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t-1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t-1, and the output generated at time step, t-1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 12:
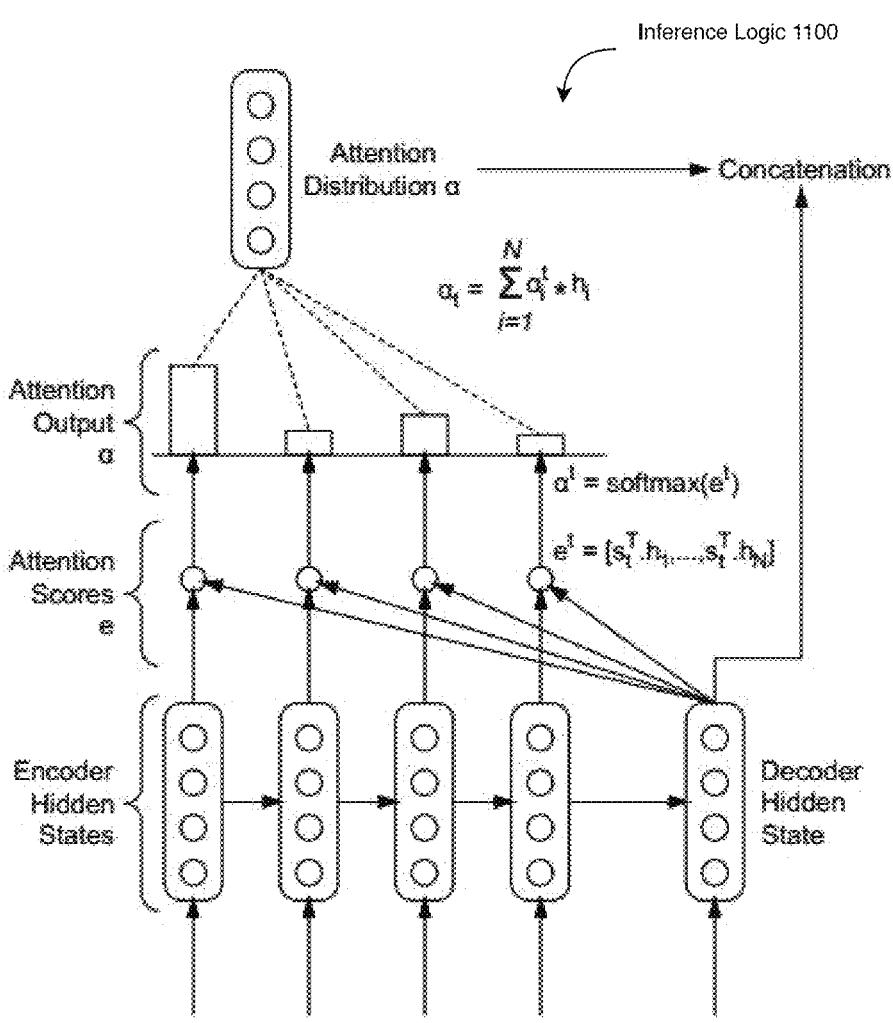
FIG. 12 shows an overview of an attention mechanism added onto an RNN encoder-decoder architecture.

Attention mechanisms distinguish Transformers from other machine learning models. The attention mechanism provides a solution for the vanishing gradient problem. FIG. 12 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical, multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 13:
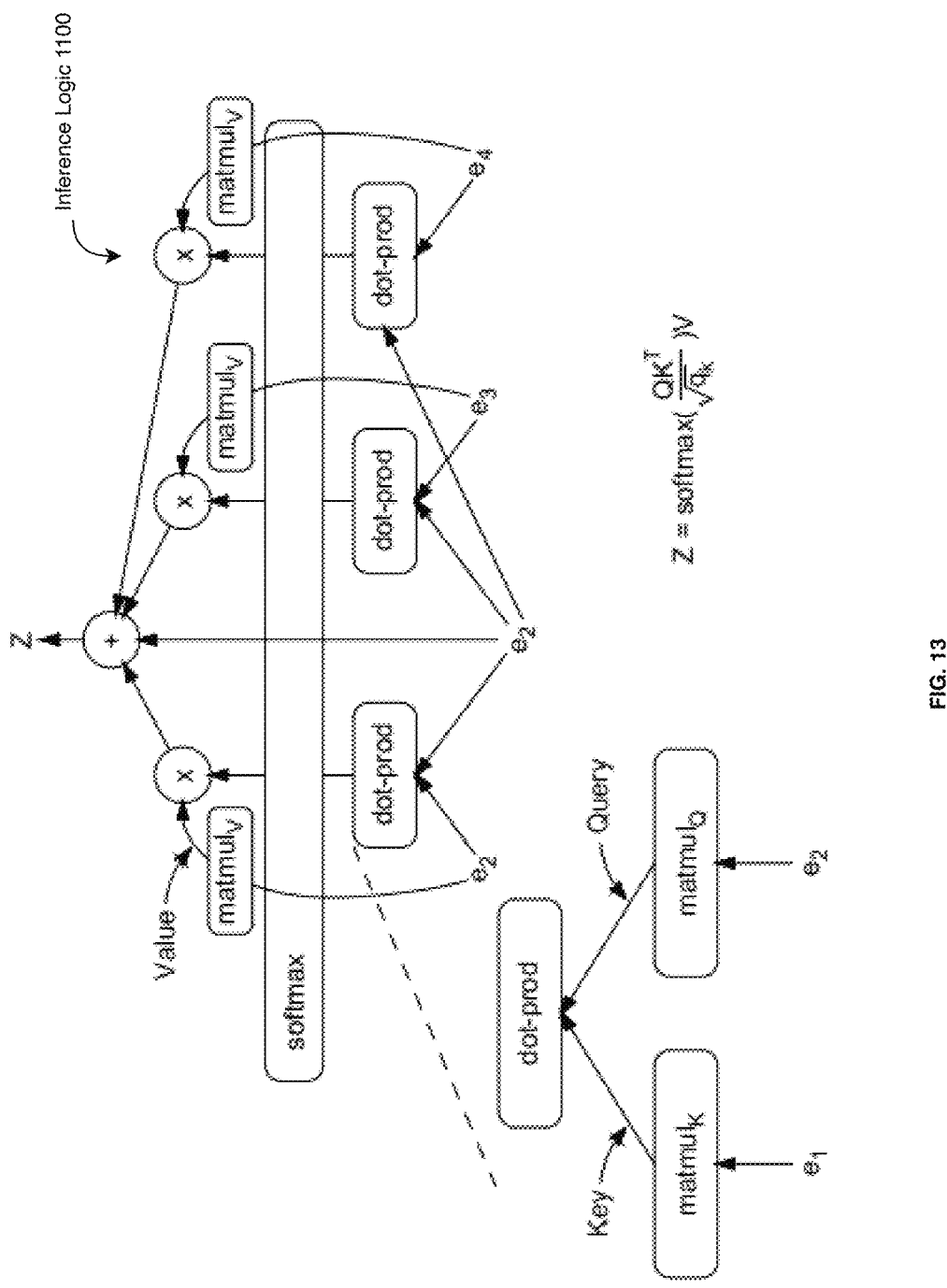
FIG. 13 is a schematic representation of the calculation of self-attention showing one attention head.

Multi-headed attention is executed in the Transformer. FIG. 13 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 14:
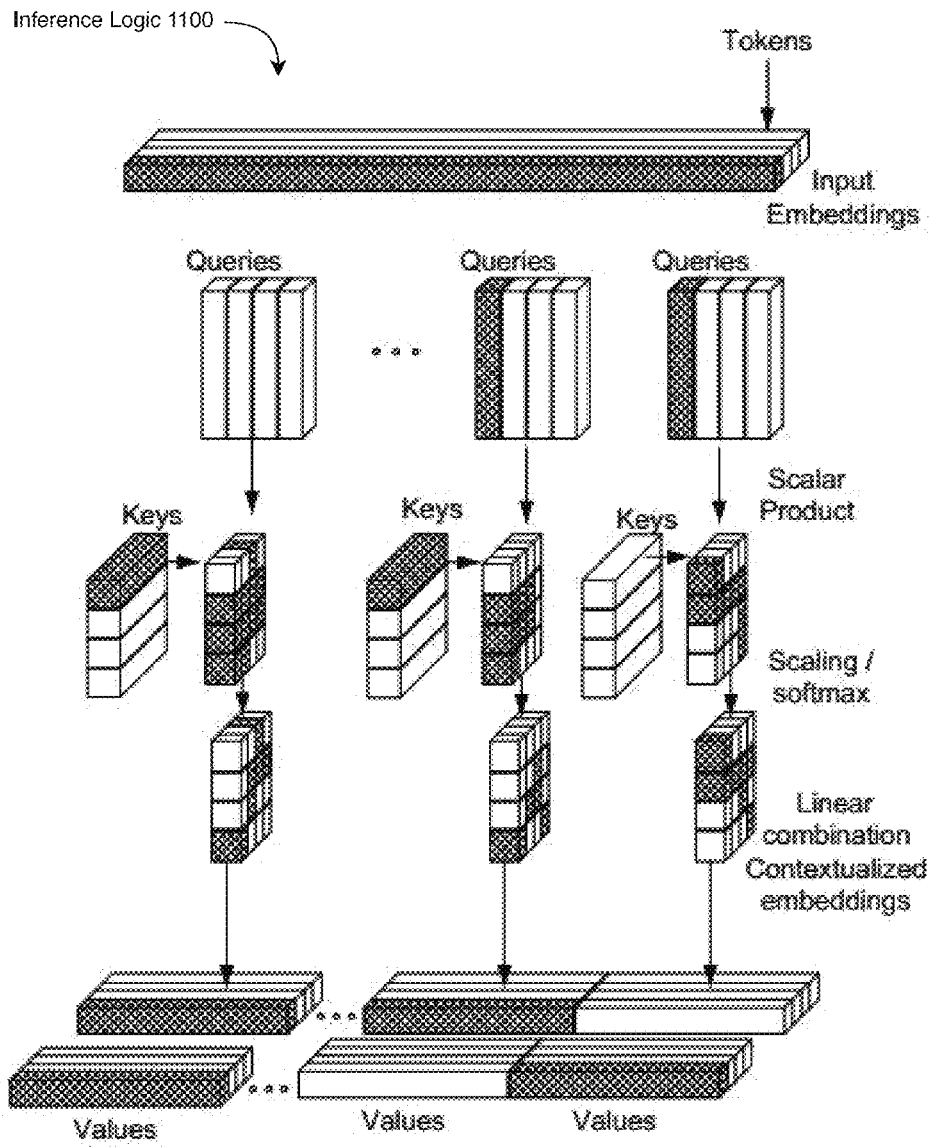
FIG. 14 is a depiction of several attention heads in a Transformer block.

FIG. 14 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

Attention $$(Q, K, V) = SoftMax\left(\frac{QK^T}{\sqrt{dk}}\right)V$$

where Q, K, V are computed as:

$$X{\cdot}W_Q, X{\cdot}W_K, X{\cdot}W_V$$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention}\,(Q, K,$$

$$V) = [\text{head}_1, \ldots, \text{head}_h]W_0 \text{ where } \text{head}_i = \text{Attention}\left(QW_i^Q, KW_i^K, VW_i^V\right)$$

The outputs of all heads are concatenated together and projected again using the learned weights matrix $W_0$ to match the dimensions expected by the next block of heads or the output of the Transformer. Using the multi-head attention instead of the simpler scaled dot-product attention enables Transformers to jointly attend to information from different representation subspaces at different positions.

Figure 15:
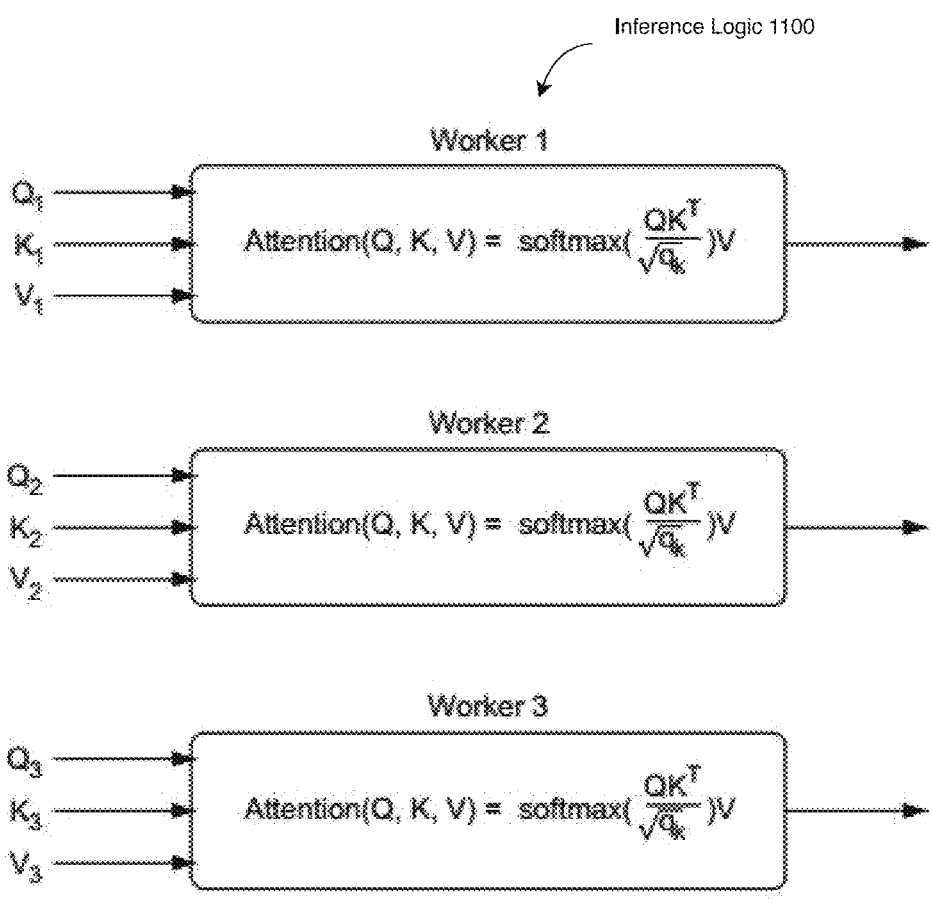
FIG. 15 is an illustration that shows how one can use multiple workers to compute the multi-head attention in parallel, as the respective heads compute their outputs independently of one another.

As shown in FIG. 15, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot W_Q, X \cdot W_K, X \cdot WV$$

The matrix X is of shape (n, d) where n is the number of patches and d is the hidden vector dimension. The weights $W_Q$, $W_K$, $W_V$ are all of shape (d, d). Omitting the constant factor 3, the resulting complexity is:

$$n \cdot d^2$$

We can proceed to the estimation of the complexity of the attention function itself, i.e., of $$SoftMax\left(\frac{QK^T}{\sqrt{dk}}\right)V.$$

The matrices Q and K are both of shape (n, d). The transposition operation does not influence the asymptotic complexity of computing the dot product of matrices of shapes (n, d)·(d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product $$SoftMax\left(\frac{QK^T}{\sqrt{dk}}\right) \cdot V$$

is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d.$$

The asymptotic complexity of multi-head attention is the same since the original input matrix X is projected into h matrices of shapes $$\left(n, \frac{d}{h}\right),$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 16:
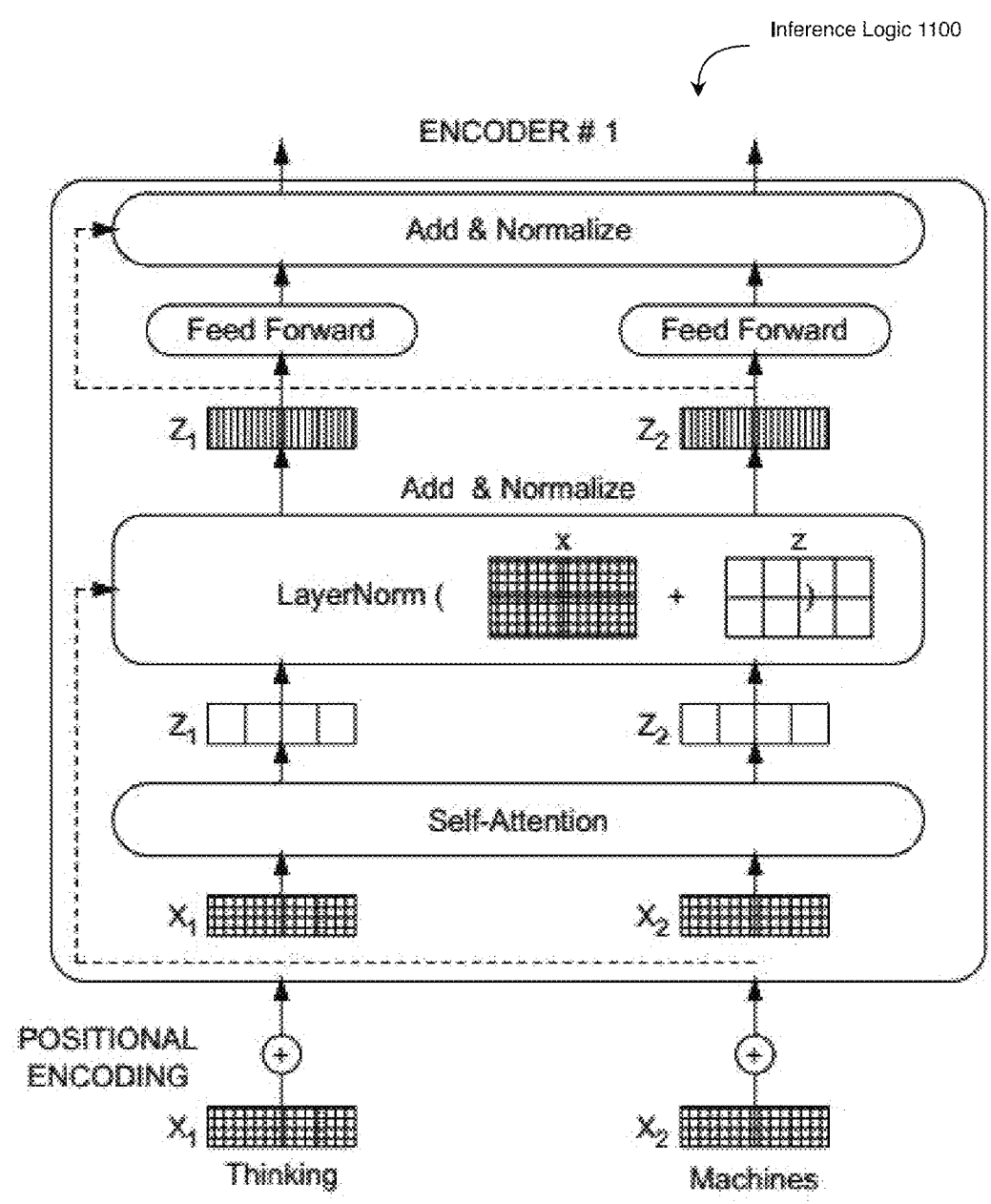
FIG. 16 is a portrayal of one encoder layer of a Transformer network.

FIG. 16 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 17:
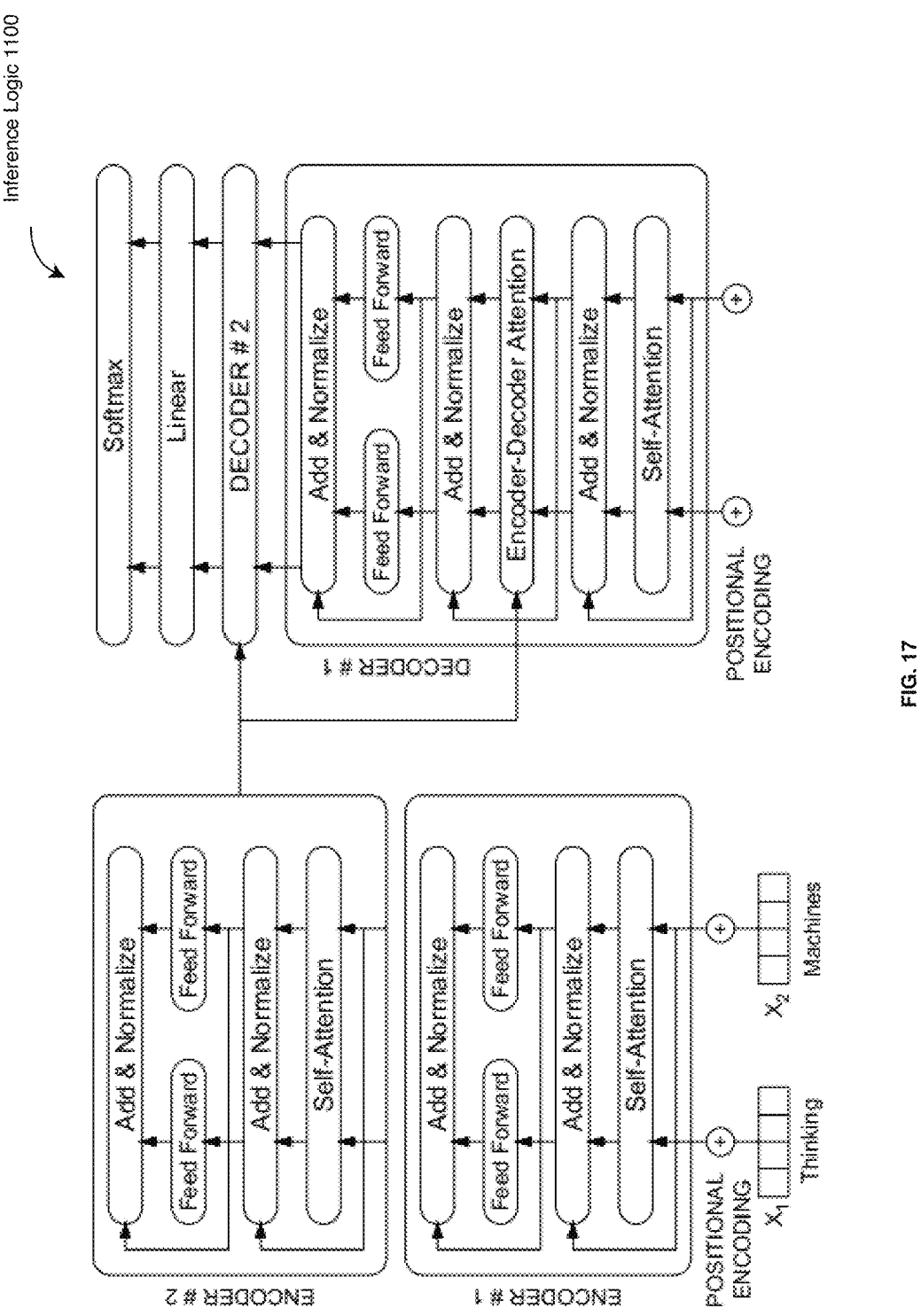
FIG. 17 shows a schematic overview of a Transformer model.
Figures 18A, 18B:
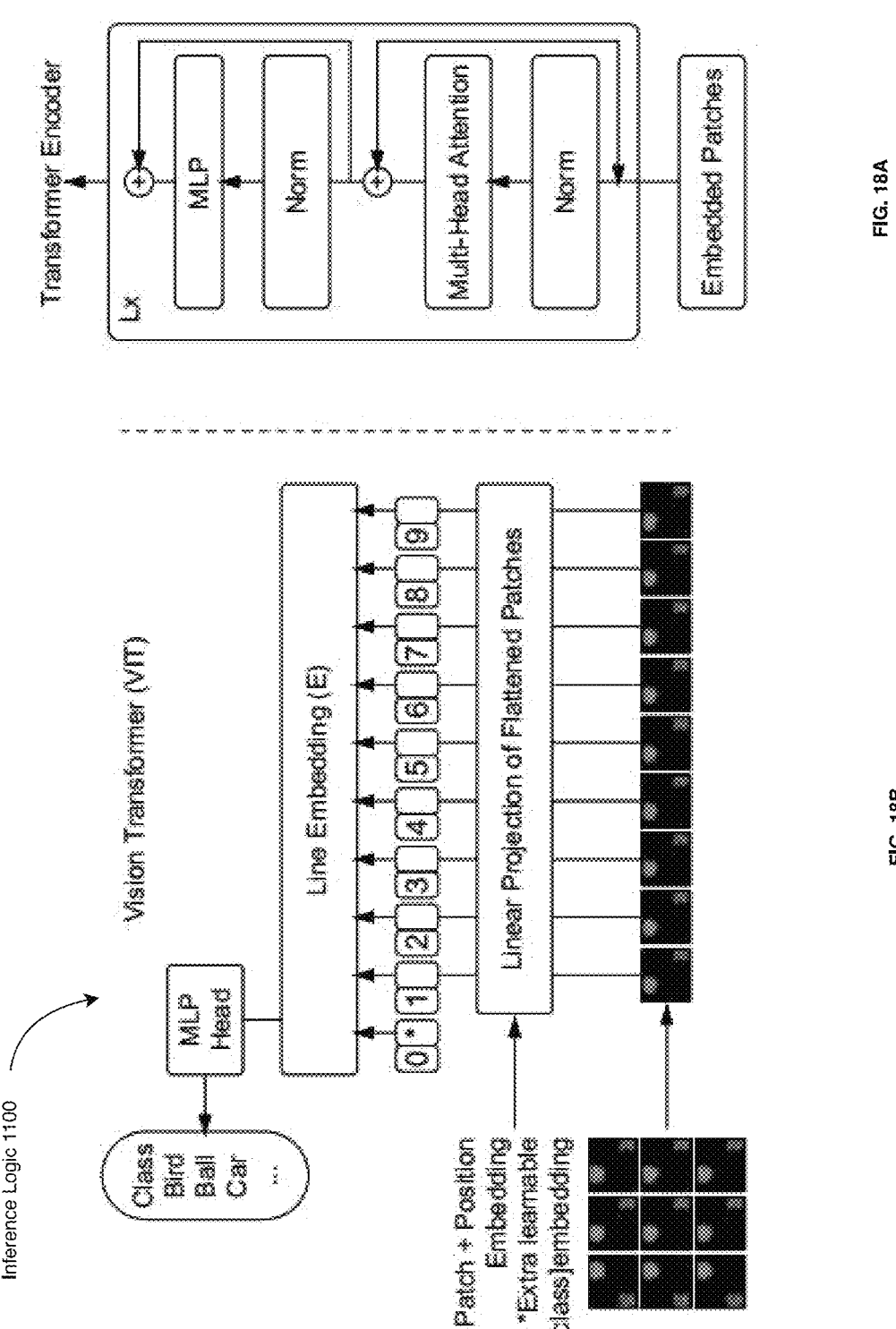
FIGS. 18A and 18B is a depiction of a Vision Transformer (ViT).
Figures 19A, 19B, 19C, 19D:
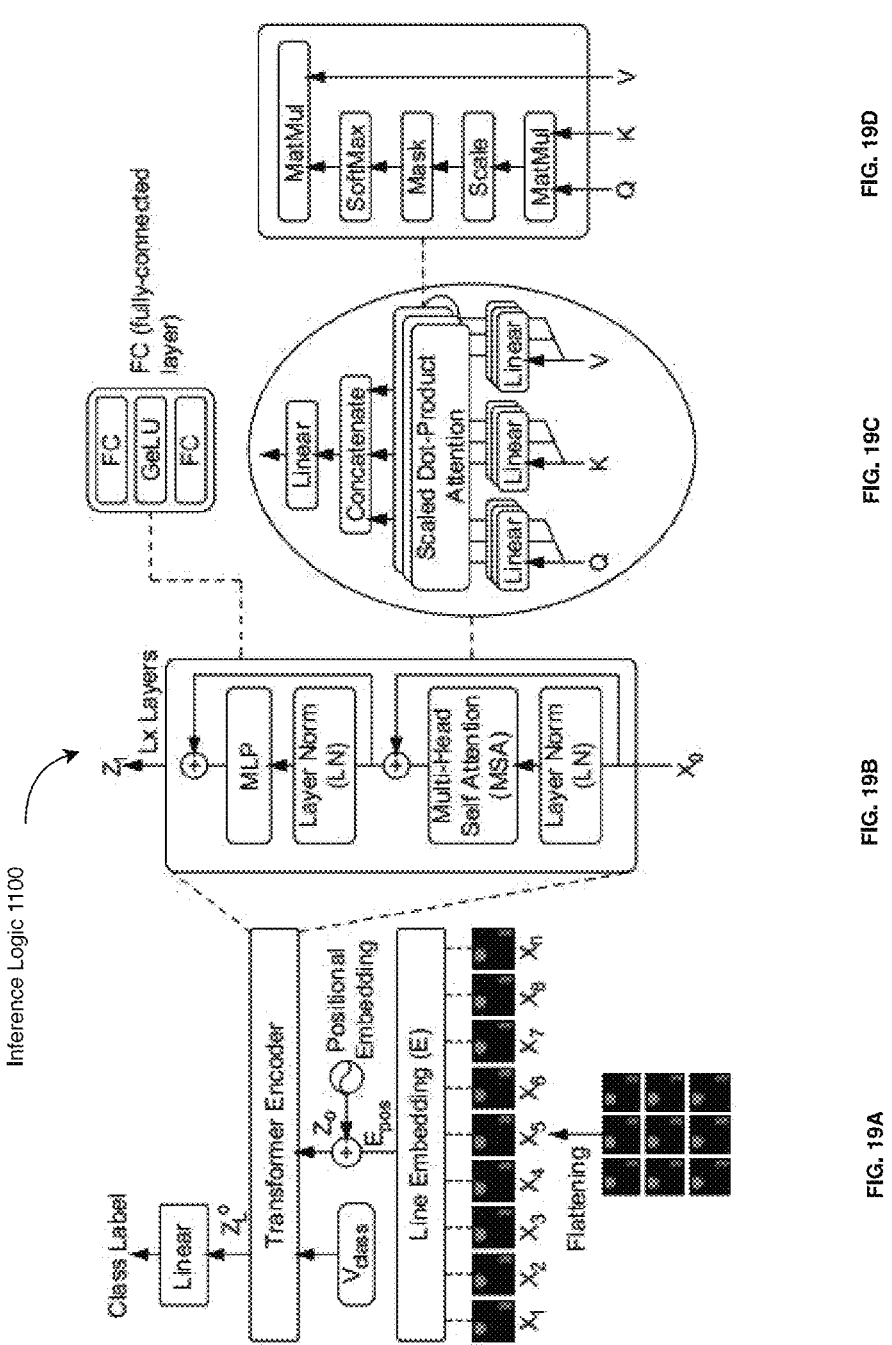
FIG. 19A-D illustrates a processing flow of the Vision Transformer (ViT).

FIG. 17 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 18A, 18B, 19A, 19B, 19C, and 19D. Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (18A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 20.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 18B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Computer Architecture

Figure 21:
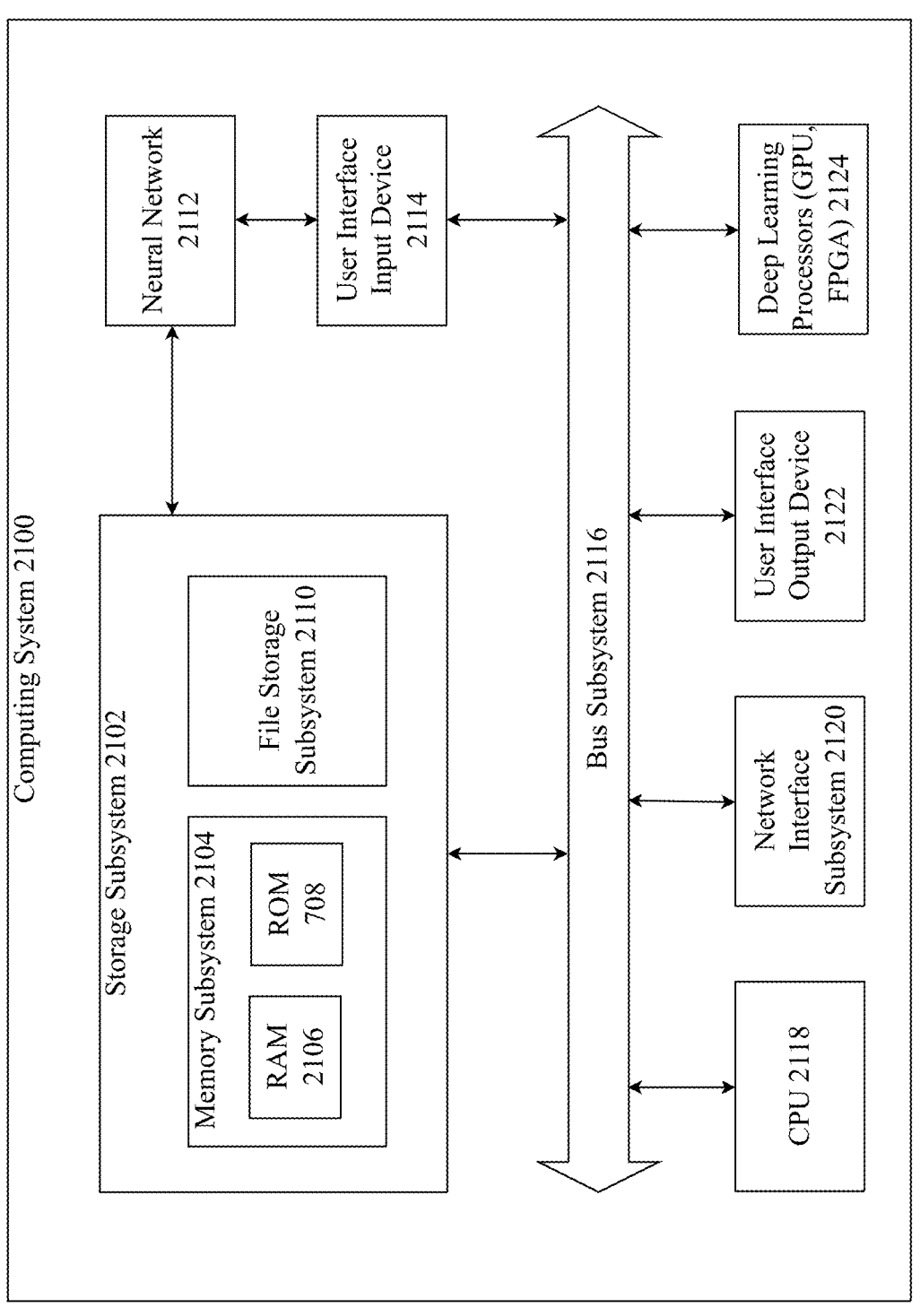
FIG. 21 shows an example computer system that can be used to implement the technology disclosed, according to certain embodiments.

FIG. 21 shows an example computer system 2100 that can be used to implement the technology disclosed. The computer system 2100 is a representation of the system 202, as described in FIG. 3. The computer system 2100 includes at least one central processing unit (CPU) 2118 that communicates with a number of peripheral devices via bus subsystem 2116. These peripheral devices can include a storage subsystem 2102 including, for example, memory devices and a file storage subsystem 2110, user interface input devices 2114, user interface output devices 2122, and a network interface subsystem 2120. The input and output devices allow user interaction with computer system 2100. Network interface subsystem 2120 provides an interface to outside networks, including an interface to corresponding interface devices in other computer systems.

In one implementation, a neural network 2112 is communicably linked to the storage subsystem 2102 and the user interface input devices 2114.

User interface input devices 2114 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2100.

User interface output devices 2122 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2100 to the user or to another machine or computer system.

Storage subsystem 2102 stores programming and data constructs that provide the functionality of some or all of the modules and methods described herein. These software modules are generally executed by deep learning processors 2124.

Deep learning processors 2124 can be graphics processing units (GPUs), field-programmable gate arrays (FPGAs), application-specific integrated circuits (ASICs), and/or coarse-grained reconfigurable architectures (CGRAs). Processors 2124 can be hosted by a deep learning cloud platform such as Google Cloud Platform™, Xilinx™, and Cirrascale™ Examples of processors 2124 include Google's Tensor Processing Unit (TPU)™, rackmount solutions like GX4 Rackmount Series™, GX6 Rackmount Series™, NVIDIA DGX-1™, Microsoft's Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPUT Fujitsu DPI™, ARM's DynamicIQ™, IBM TrueNorth™, Lambda GPU Server with Testa V100s™, and others.

Memory subsystem 2104 used in the storage subsystem 2102 can include a number of memories including a main random-access memory (RAM) 2106 for storage of instructions and data during program execution and a read only memory (ROM) 2108 in which fixed instructions are stored. A file storage subsystem 2110 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2110 in the storage subsystem 2102, or in other machines accessible by the processor.

Bus subsystem 2116 provides a mechanism for letting the various components and subsystems of computer system 2100 communicate with each other as intended. Although bus subsystem 2116 is shown schematically as a single bus, alternative implementations of the bus subsystem can use multiple buses.

Computer system 2100 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 2100 depicted in FIG. 21 is intended only as a specific example for the purpose of illustrating the preferred implementations of the present technology disclosed. Many other configurations of computer system 2100 are possible having more or fewer components than the computer system depicted in FIG. 21.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 21, computer system/server in computing node 700 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A computer-implemented method comprising:

acquiring a plurality of context parameters including behavioral data, environmental factors, temporal parameters, task-related indicators, social signals, emotional indicators, and device-ecosystem availability;

generating, from the plurality of context parameters, a context vector comprising values of the parameters together with corresponding confidence scores and temporal-decay values;

computing a context score by applying a weighted aggregation of the values, confidence scores, and temporal-decay values;

predicting, using a machine learning model, one or more context states based on the context vector;

pre-generating, for the one or more predicted context states, a plurality of candidate interface scenes comprising layout structures, interaction flows, and component hierarchies;

selecting a candidate interface scene by applying a transition policy that enforces continuity preservation across interface states;

rendering the selected candidate interface scene on a display device, the rendering comprising a cinematic transition that maintains user mental models and application state;

upon detection that the selected candidate interface scene does not fulfil a performance criterion, reverting to a previously active interface scene using a rollback procedure; and synchronizing the selected candidate interface scene with a companion device to maintain cross-device continuity of user interaction.

2. The method of claim 1, wherein the behavioral data comprise at least one of: historical interaction logs, user role information, heart rate, stress indicators, or eye-tracking signals.

3. The method of claim 1, wherein the environmental factors comprise at least one of: device capabilities, camera input, ambient lighting, ambient noise, or network connectivity.

4. The method of claim 1, wherein predicting the one or more context states further comprises forecasting a likelihood of context transitions and anticipating functional requirements prior to explicit user requests.

5. The method of claim 1, wherein pre-generating the plurality of candidate interface scenes comprises querying a scene library for templates and dynamically composing a new interface scene when no matching template exists.

6. The method of claim 1, further comprising performing an optimization pass on the selected candidate interface scene based on at least one of: usability metrics, latency thresholds, or accessibility constraints.

7. The method of claim 1, further comprising applying role-aware filtering to the rendered candidate interface scene to display user-appropriate information while suppressing information reserved for a different role.

8. The method of claim 1, wherein the transition policy specifies a confidence threshold and a utility metric, and the cinematic transition is executed only when the confidence threshold and utility metric fulfil predefined conditions.

9. The method of claim 1, further comprising continuously retraining the machine learning model based on implicit user feedback, A/B testing results, and performance metric telemetry.

10. The method of claim 1, wherein synchronizing with the companion device comprises transmitting a synchronization token representing the active scene and context vector to a wearable device, workstation, or mobile device to provide a seamless cross-device continuity.

11. A system comprising:

a memory storing instructions; and one or more processors configured to execute the instructions to:

receive a plurality of context parameters comprising behavioral, environmental, temporal, task, social, emotional, and device-ecosystem data;

generate a context vector comprising the context parameters, confidence scores, and temporal-decay values;

compute a context score based on weighted aggregation of the context vector;

predict one or more context states and pre-generate candidate interface scenes corresponding to the predicted context states;

apply a transition policy to select one of the candidate interface scenes for rendering;

render the selected interface scene with continuity preservation and cinematic transition;

revert to a prior interface scene when the selected interface scene fails a performance criterion; and synchronize the selected interface scene with a companion device for cross-device continuity.

12. The system of claim 11, further configured to normalize sensor data, assign weights, and update the confidence scores and temporal-decay values.

13. The system of claim 11, further configured to forecast transitions, anticipate functional requirements, and pre-generate candidate interface scenes.

14. The system of claim 11, further configured to manage continuity, state preservation, cinematic animations, and rollback.

15. The system of claim 11, further configured to receive implicit feedback, conduct automated A/B testing, track performance metrics, and retrain predictive models.

16. The system of claim 11, wherein the companion device is selected from a group consisting of: smart glasses, smartphones, tablet computers, laptop computers, desktop workstations, and wearable peripherals.

17. The system of claim 11, wherein the transition policy comprises thresholds for prediction confidence and task utility, and rollback is triggered when utility falls below a predefined threshold for a predefined period.

18. The system of claim 11, further configured to generate novel scenes when no template satisfies the context vector.

19. The system of claim 11, wherein role-aware filtering is applied to suppress information not permitted for a given user role in a workflow.

20. The system of claim 11, wherein synchronization further comprises maintaining a scene graph representation and transmitting synchronization tokens across devices to ensure continuity.

* * * * *